United States Patent
Svendsen et al.

(10) Patent No.: US 11,326,363 B2
(45) Date of Patent: May 10, 2022

(54) WIRELESS SWIMMING POOL LED LIGHTING DEVICE

(71) Applicant: Guangzhou Rising Dragon Recreation Industrial Co., Guangzhou (CN)

(72) Inventors: William Svendsen, Canby, OR (US); Brett Fritts, Canby, OR (US); Richard Laitta, Canby, OR (US); Jonathan Quon, Concord, CA (US); Dai Zhongguo, Foshan (CN)

( * ) Notice: Subject to any disclaimer, the term of this patent is extended or adjusted under 35 U.S.C. 154(b) by 0 days.

(21) Appl. No.: 17/269,624

(22) PCT Filed: Jan. 23, 2020

(86) PCT No.: PCT/IB2020/050522
§ 371 (c)(1),
(2) Date: Feb. 19, 2021

(87) PCT Pub. No.: WO2020/152615
PCT Pub. Date: Jul. 30, 2020

(65) Prior Publication Data
US 2021/0301547 A1  Sep. 30, 2021

Related U.S. Application Data

(60) Provisional application No. 62/827,750, filed on Apr. 1, 2019.

(30) Foreign Application Priority Data

Jan. 25, 2019  (CN) .......................... 201920142460.6

(51) Int. Cl.
*E04H 4/14*       (2006.01)
*H02J 50/10*      (2016.01)
(Continued)

(52) U.S. Cl.
CPC .............. *E04H 4/148* (2013.01); *F21S 8/036* (2013.01); *F21V 17/06* (2013.01); *F21V 19/04* (2013.01);
(Continued)

(58) Field of Classification Search
CPC ......... E04H 4/148; H02J 50/10; H02J 50/005; H05B 45/20; H05B 47/17; H05B 47/195;
(Continued)

(56) References Cited

U.S. PATENT DOCUMENTS 6,529,127 B2   3/2003  Townsend et al.
7,125,146 B2  10/2006  Willis et al.
(Continued)

FOREIGN PATENT DOCUMENTS

CN     1134636 A     10/1996
CN   201437940 U      4/2010
(Continued)

OTHER PUBLICATIONS

BGB SILS, "BGB SILS Brochure.pdf," archived at https://web.archive.org/web/20141122090624/http://www.bgbinnovation.com/brochures/bgbsils-brochure-2014/, archived Dec. 4, 2014, 13 pages.
(Continued)

*Primary Examiner* — Bao Q Truong
(74) *Attorney, Agent, or Firm* — Robinson IP Law, PLLC

(57) ABSTRACT

A LED lighting device (80) is installable on a standard wall fitting (10). The LED lighting device (80) includes an inductive power transmitter (84) including a housing (146), a tee top (112) on the housing (146) including a flat inductive power transfer face (120), and an inductive transmitter coil (154) located within the tee top (112). A LED lamp module (86) of the LED lighting device (80) includes a LED lamp body (184) containing one or more LEDs (180), a threaded male portion (131) formed on the LED lamp body (184) and (Continued)

shaped to threadably engage the standard wall fitting (10), an inductive power receiver pad (132) located adjacent a flat surface (120) of the threaded male portion (131), and an inductive power receiver coil (166) located in the LED lamp body (184). When the LED lighting device (80) is installed on the standard wall fitting (10), the LED lamp module (86) is wirelessly powered by the inductive power transmitter (84).

20 Claims, 16 Drawing Sheets

(51) Int. Cl.
| | |
|---|---|
| H05B 45/20 | (2020.01) |
| H02J 50/00 | (2016.01) |
| H05B 47/17 | (2020.01) |
| H05B 47/195 | (2020.01) |
| F21S 8/00 | (2006.01) |
| F21V 17/06 | (2006.01) |
| F21V 19/04 | (2006.01) |
| F21V 23/02 | (2006.01) |
| F21V 23/04 | (2006.01) |
| F21Y 115/10 | (2016.01) |
| F21W 131/401 | (2006.01) |

(52) U.S. Cl.
CPC .......... *F21V 23/023* (2013.01); *F21V 23/045* (2013.01); *H02J 50/005* (2020.01); *H02J 50/10* (2016.02); *H05B 45/20* (2020.01); *H05B 47/17* (2020.01); *H05B 47/195* (2020.01); *F21W 2131/401* (2013.01); *F21Y 2115/10* (2016.08)

(58) Field of Classification Search
CPC ........... F21S 8/036; F21S 8/033; F21V 17/06; F21V 19/04; F21V 23/023; F21V 23/045; F21V 31/00; F21Y 2115/10; F21W 2131/401
See application file for complete search history.

(56) References Cited

U.S. PATENT DOCUMENTS

| | | | |
|---|---|---|---|
| 7,178,178 | B2 | 2/2007 | Hutchings |
| 7,396,143 | B2 | 7/2008 | Sloan |
| 8,030,851 | B2 | 10/2011 | Vernondier et al. |
| 8,471,687 | B2 | 6/2013 | Steiner et al. |
| 8,502,464 | B2 | 8/2013 | Lakirovich |
| 8,581,517 | B2 | 11/2013 | Kuo et al. |
| 9,544,964 | B2 | 1/2017 | Li |
| 2005/0007766 | A1 | 1/2005 | Jigamian |
| 2006/0101567 | A1* | 5/2006 | Hutchings ............... H02J 50/40 4/496 |
| 2008/0048579 | A1 | 2/2008 | Vernondier |
| 2009/0284164 | A1 | 11/2009 | Ray |
| 2012/0112531 | A1 | 5/2012 | Kesler |
| 2012/0212150 | A1* | 8/2012 | Lakirovich ............ H05B 45/20 315/250 |
| 2012/0222997 | A1 | 9/2012 | Potucek et al. |
| 2014/0036511 | A1 | 2/2014 | Whitfield |
| 2014/0203710 | A1 | 7/2014 | Li |

FOREIGN PATENT DOCUMENTS

| | | |
|---|---|---|
| CN | 209054461 U | 7/2019 |
| CN | 209587769 U | 11/2019 |
| DE | 20004069 U1 | 7/2000 |
| EP | 1147758 B1 | 1/2006 |
| FR | 2998104 A1 | 5/2014 |
| JP | 2002251901 A | 9/2002 |
| WO | WO2014117481 A1 | 8/2014 |
| WO | WO2018107428 A1 | 6/2018 |

OTHER PUBLICATIONS

Written Opinion of the International Searching Authority, PCT App. No. PCT/IB2020/050522 (dated Apr. 24, 2020).
International Search Report, PCT App. No. PCT/IB2020/050522 (dated Apr. 24, 2020).

* cited by examiner

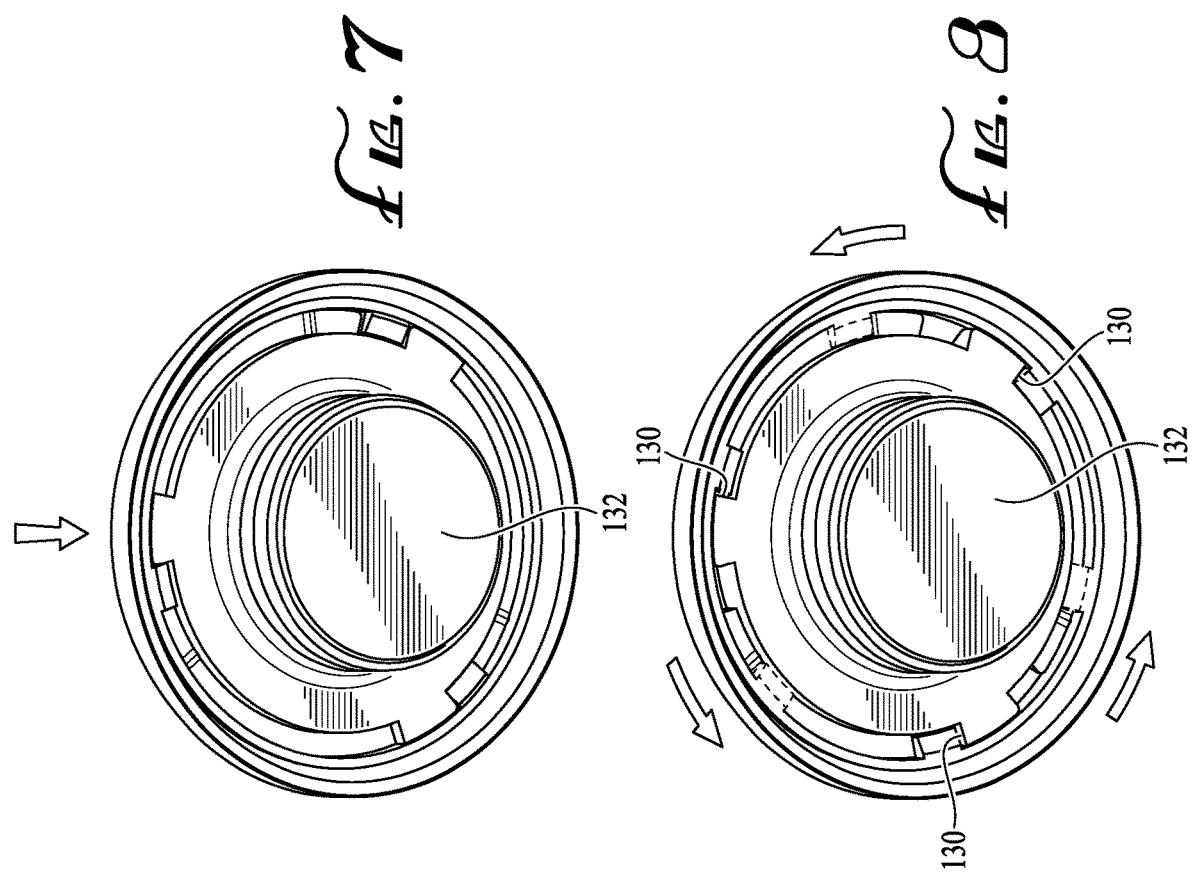
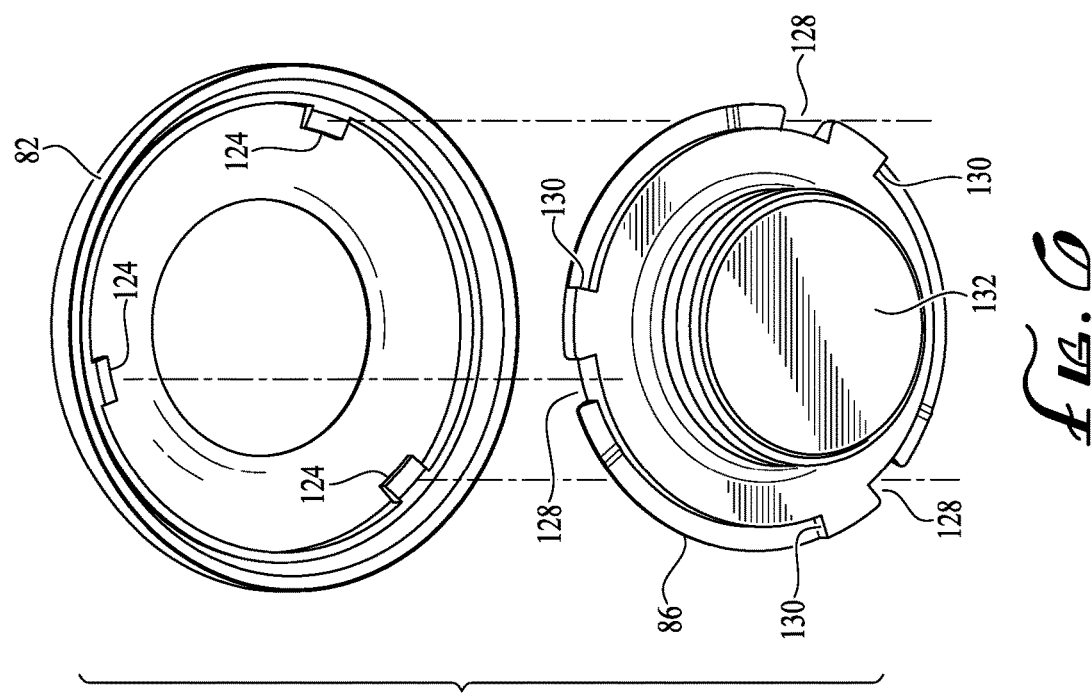

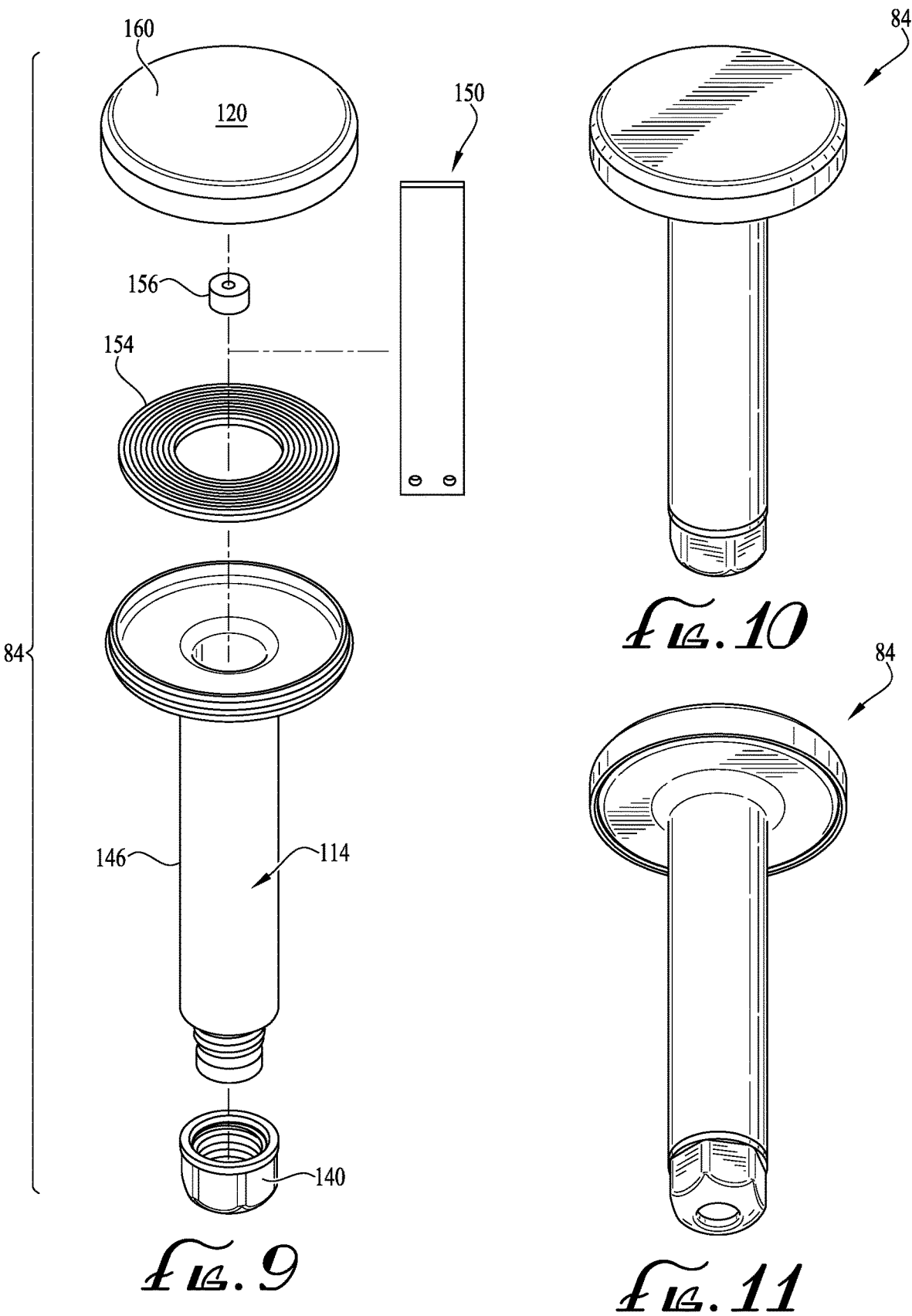

WIRELESS SWIMMING POOL LED LIGHTING DEVICE

CROSS-REFERENCES TO RELATED APPLICATIONS

This application claims priority to Chinese patent application number 201920142460.6 for a Wireless Swimming Pool Light and filed on Jan. 25, 2019, and further claims priority to U.S. Provisional Patent Application No. 62/827,750 for a LED Lighting Device Having Inductive Power Supply for Wireless Power Transfer Inside Threaded Interior Cavity of Standard Spa or Pool Wall Fitting and filed on Apr. 1, 2019, the contents of which are incorporated herein by reference in their entireties.

FIELD

The present disclosure relates to a swimming pool lamp, and more particularly, to a wireless swimming pool lamp.

BACKGROUND

LED underwater lamps have been widely used in swimming pools, fountains, bathing pools and the like. However, existing LED underwater lamps typically require one or more wires to connect external power lines and signal lines. Pulling of the cable due to water flow and other factors may result in damage to the cable and may further cause a failure in the lamp or even pose a safety hazard. When existing LED underwater lamps fail and need to be replaced or repaired, it may be required to completely drain the water from a surrounding environment, such as a swimming pool, before replacement or repair, thereby making replacement or repair of the LED underwater lamp in application occasions such as swimming pools and fountains difficult and inconvenient.

FIGS. 1 and 2 illustrate cross sectional views of a standard wall fitting 10 (also known as return wall fittings) screwed into a receptacle 12 of a pool wall 14, showing standard wall fitting 10 with and without, respectively, a conventional pool lighting device 18 according to the prior art. Accordingly, FIG. 1 also shows a conventional pool light device 18 screwed into a threaded interior section 20 of standard wall fitting 10.

There are several varieties of standard wall fittings for securing various types water jets, water suction nozzles, lighting devices, and other pool or spa implements. As one example, FIG. 2 shows standard wall fitting 10 including a face 24 and a cylindrical body 30. Face 24 has a central aperture 32 (or mouth) for receiving the desired pool or spa implements. Face 24 also includes an outer rim 36 (or flange) that rests against a surface 40 of pool wall 14 when an outer threaded section 42 of cylindrical body 30 is screwed into receptacle 12. In another embodiment, outer threaded section 42 may be smooth or accommodate different types of fasteners to secure standard wall fittings within receptacles of spa or pool walls.

An interior cavity 44 of standard wall fitting 10 includes threaded interior section 20 sized to receive—i.e., having an inside diameter of typically about 1 and ½ inch (3.81 cm)—corresponding threaded male portion 48 (FIG. 1) of device 18 (or other implement). Threaded interior section 20 ends at an annular stop 50 (or ridge) that defines a face-to-stop distance 54 and, in some embodiments, serves to separate threaded interior section 20 from a smooth cylindrical sidewall 60. Sidewall 60 is sized to receive a free end 62 of a conduit 64.

FIGS. 1 and 2 show in phantom lines two different options for free end 62: a wide-mouthed section 66 (FIG. 1) and a wide-to-narrow conduit adapter 68 (FIG. 2). Because device 18 includes an integral power supply 70 having a relatively wide diameter and length that extends past a back opening 72 of standard wall fitting 10, wide-to-narrow conduit adapter 68 (FIG. 2) is too narrow and shallow and therefore may block the installation of device 18. Thus, wide-mouthed section 66 is needed to accommodate a depth of integral power supply 70. Wide-to-narrow conduit adapter 68, however, is commonly preinstalled and cannot be readily removed when unsuccessfully attempting to install device 18.

When deployed underwater, conventional light device 18 is problematic such as for reasons described in U.S. Pat. No. 9,544,964. The '964 patent describes a previous inductive-coupling lighting system for use in high-moisture operating environments. Previous systems such as those of the '964 Patent on electromagnetic inductive coupling for simultaneous wireless (contactless) transfer of power and lighting-control commands. The system uses matable male and female inductive components. In particular, the female inductive component is designed as a substitute for standard wall fittings of the type shown in FIGS. 1 and 2. This approach is excellent for new installations, although there are some installations in which standard wall fittings are desired.

SUMMARY

The above and other needs are met by an LED lighting device that is installable on a standard wall fitting, such as a standard wall fitting located in a pool. In a first aspect, an LED lighting device is installable on a standard wall fitting having a cylindrical body, a threaded interior section located, and an annular stop located at an end of the threaded interior section, and includes: an inductive power transmitter including a housing shaped to fit through the standard wall fitting, the housing having a first end and a second end, a tee top located at the first end of the housing including a flat inductive power transfer face located on an end thereof and an underside surface shaped to contact the annular stop of the standard wall fitting, and an inductive transmitter coil located within the tee top and arranged such that a plane of the inductive transmitter coil is substantially parallel to the flat inductive power transfer face of the tee top, the inductive transmitter coil in electrical communication with a power source; and an LED lamp module including an LED lamp body including an upper end and a lower end, the LED lamp body containing one or more LEDs, a threaded male portion formed on the lower end of the LED lamp body and shaped to threadably engage the threaded interior section of the standard wall fitting, the threaded male portion including a flat surface formed on an end thereof, an inductive power receiver pad located adjacent the flat surface of the threaded male portion, and an inductive power receiver coil located within the threaded male portion proximate to the inductive power receiver pad. The tee top of the inductive power transmitter is configured to be located between the annular stop of the standard wall fitting and the inductive power-receiver pad of the LED lamp module.

In one embodiment, the LED lighting device further includes: an IR emitter located in the tee top of the inductive power transmitter and an IR receiver located in the LED lamp body of the LED lamp module. The LEDs of the LED lamp module are controlled by signals detected by the IR receiver of the LED lamp module the IR emitter of the inductive power transmitter. In another embodiment, the LED lighting device further includes: an internal depression located adjacent the flat inductive power transfer face of the inductive power transmitter and an IR receiver mounting cradle located adjacent the flat surface on the threaded male portion of the LED lamp module. The IR emitter is located on the internal depression and the IR receiver is mounted on the mounting cradle. The IR receiver is located in visual alignment with the IR emitter when the LED lighting device is installed on the standard wall fitting.

In yet another embodiment, the LED lamp module further includes a decorative trim plate removably installed on the LED lamp body. In one embodiment, the LED lighting device further includes: a plurality of spaced-apart tabs located around an underside of the decorative trim plate and a plurality of notches located around an outer circumference of the LED lamp body. The decorative trim plate is removably secured on the LED lamp body by aligning the plurality of spaced-apart tabs of the decorative trim plate with the plurality of notches of the LED lamp body and subsequently rotating the decorative trim plate with respect to the LED lamp body.

In one embodiment, the LED lighting device further includes a spacer located on the inductive power transmitter adjacent to the tee top, wherein the spacer is located between the tee top and the annular stop of the standard wall fitting when the LED lighting device is installed on the standard wall fitting.

In another embodiment, the LED lighting device further includes an electrical supply cable connected at a first end to electrical supply equipment and at a second end to the inductive power transmitter.

In yet another embodiment, the LED lamp module is configured to removed or installed on the standard wall fitting adjacent the inductive power transmitter when the standard wall fitting is located below a water level of an area at which the standard wall fitting is located.

In one embodiment, the one or more LEDs of the LED lamp body are controllable to produce various color modes. In another embodiment, the one or more LEDs are controllable to produce various color modes, and wherein a sequence of the one or more LEDs is communicated from the IR emitter of the inductive power transmitter to the IR receiver of the LED lamp module. In yet another embodiment, one of the various color modes may be selected by a signal transmitted from the IR emitter of the inductive power transmitter to the IR receiver of the LED lamp module.

In a second aspect, an LED lighting device installed on a standard wall fitting having a cylindrical body, a threaded interior section located, and an annular stop located at an end of the threaded interior section, and includes: an inductive power transmitter including a housing shaped to fit through the standard wall fitting, the housing having a first end and a second end, a tee top located at the first end of the housing including a flat inductive power transfer face located on an end thereof and an underside surface shaped to contact the annular stop of the standard wall fitting, an IR emitter located in the tee top of the inductive power transmitter, and an inductive transmitter coil located within the tee top and arranged such that a plane of the inductive transmitter coil is substantially parallel to the flat inductive power transfer face of the tee top, the inductive transmitter coil in electrical communication with a power source; and an LED lamp module including an LED lamp body including an upper end and a lower end, the LED lamp body containing one or more LEDs, a threaded male portion formed on the lower end of the LED lamp body and shaped to threadably engage the threaded interior section of the standard wall fitting, the threaded male portion including a flat surface formed on an end thereof, an inductive power receiver pad located adjacent the flat surface of the threaded male portion, an inductive power receiver coil located within the threaded male portion proximate to the inductive power receiver pad, and an IR receiver located in the LED lamp body of the LED lamp module. The tee top of the inductive power transmitter is configured to be located between the annular stop of the standard wall fitting and the inductive power-receiver pad of the LED lamp module. The LEDs of the LED lamp module are controlled by signals detected by the IR receiver of the LED lamp module the IR emitter of the inductive power transmitter.

In one embodiment, the LED lighting device further includes: an internal depression located adjacent the flat inductive power transfer face of the inductive power transmitter and an IR receiver mounting cradle located adjacent the flat surface on the threaded male portion of the LED lamp module. The IR emitter is located on the internal depression and the IR receiver is mounted on the mounting cradle. The IR receiver is located in visual alignment with the IR emitter when the LED lighting device is installed on the standard wall fitting.

In another embodiment, the LED lamp module further comprising a decorative trim plate removably installed on the LED lamp body. In yet another embodiment, the LED lighting device further includes: a plurality of spaced-apart tabs located around an underside of the decorative trim plate and a plurality of notches located around an outer circumference of the LED lamp body. The decorative trim plate is removably secured on the LED lamp body by aligning the plurality of spaced-apart tabs of the decorative trim plate with the plurality of notches of the LED lamp body and subsequently rotating the decorative trim plate with respect to the LED lamp body.

In one embodiment, the LED lighting device further includes a spacer located on the inductive power transmitter adjacent to the tee top, wherein the spacer is located between the tee top and the annular stop of the standard wall fitting when the LED lighting device is installed on the standard wall fitting.

In another embodiment, the LED lighting device further includes an electrical supply cable connected at a first end to electrical supply equipment and at a second end to the inductive power transmitter.

In yet another embodiment, the LED lamp module is configured to be one of removed or installed on the standard wall fitting adjacent the inductive power transmitter when the standard wall fitting is located below a water level of an area at which the standard wall fitting is located.

In one embodiment, the one or more LEDs of the LED lamp body are controllable to produce various color modes.

In a third aspect, an LED lighting device is installable on a standard wall fitting having a cylindrical body, a threaded interior section located, and an annular stop located at an end of the threaded interior section, the LED lighting device including: an inductive power transmitter including: a housing shaped to fit through the standard wall fitting, the housing having a first end and a second end, a tee top located at the first end of the housing including a flat inductive power transfer face located on an end thereof and an underside surface shaped to contact the annular stop of the standard wall fitting, and an inductive transmitter coil located within the tee top and arranged such that a plane of the inductive transmitter coil is substantially parallel to the flat inductive power transfer face of the tee top, the inductive transmitter coil in electrical communication with a power source; and an LED lamp module including an LED lamp body including an upper end and a lower end, the LED lamp body containing one or more LEDs, a threaded male portion formed on the lower end of the LED lamp body and shaped to threadably engage the threaded interior section of the standard wall fitting, the threaded male portion including a flat surface formed on an end thereof, an inductive power receiver pad located adjacent the flat surface of the threaded male portion, and an inductive power receiver coil located within the threaded male portion proximate to the inductive power receiver pad. The tee top of the inductive power transmitter is configured to be located between the annular stop of the standard wall fitting and the inductive power-receiver pad of the LED lamp module. The LED lamp module is configured to be one of removed or installed on the standard wall fitting adjacent the inductive power transmitter when the standard wall fitting is located below a water level of an area at which the standard wall fitting is located.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

FIG. 6 shows an exploded view of a decorative trim plate and LED lamp module of an LED lighting device according to one embodiment of the present disclosure;

FIGS. 7-8 show attachment of decorative trim plate to an LED lamp module according to one embodiment of the present disclosure;

FIG. 9 shows an exploded view of an inductive power emitter of an LED lighting device according to one embodiment of the present disclosure;

FIG. 10 shows a top perspective view of an inductive power emitter of an LED lighting device according to one embodiment of the present disclosure;

FIG. 11 shows a bottom perspective view of an inductive power emitter of an LED lighting device according to one embodiment of the present disclosure;

DETAILED DESCRIPTION

Various terms used herein are intended to have particular meanings. Some of these terms are defined below for the purpose of clarity. The definitions given below are meant to cover all forms of the words being defined (e.g., singular, plural, present tense, past tense). If the definition of any term below diverges from the commonly understood and/or dictionary definition of such term, the definitions below control.

Figure 3:
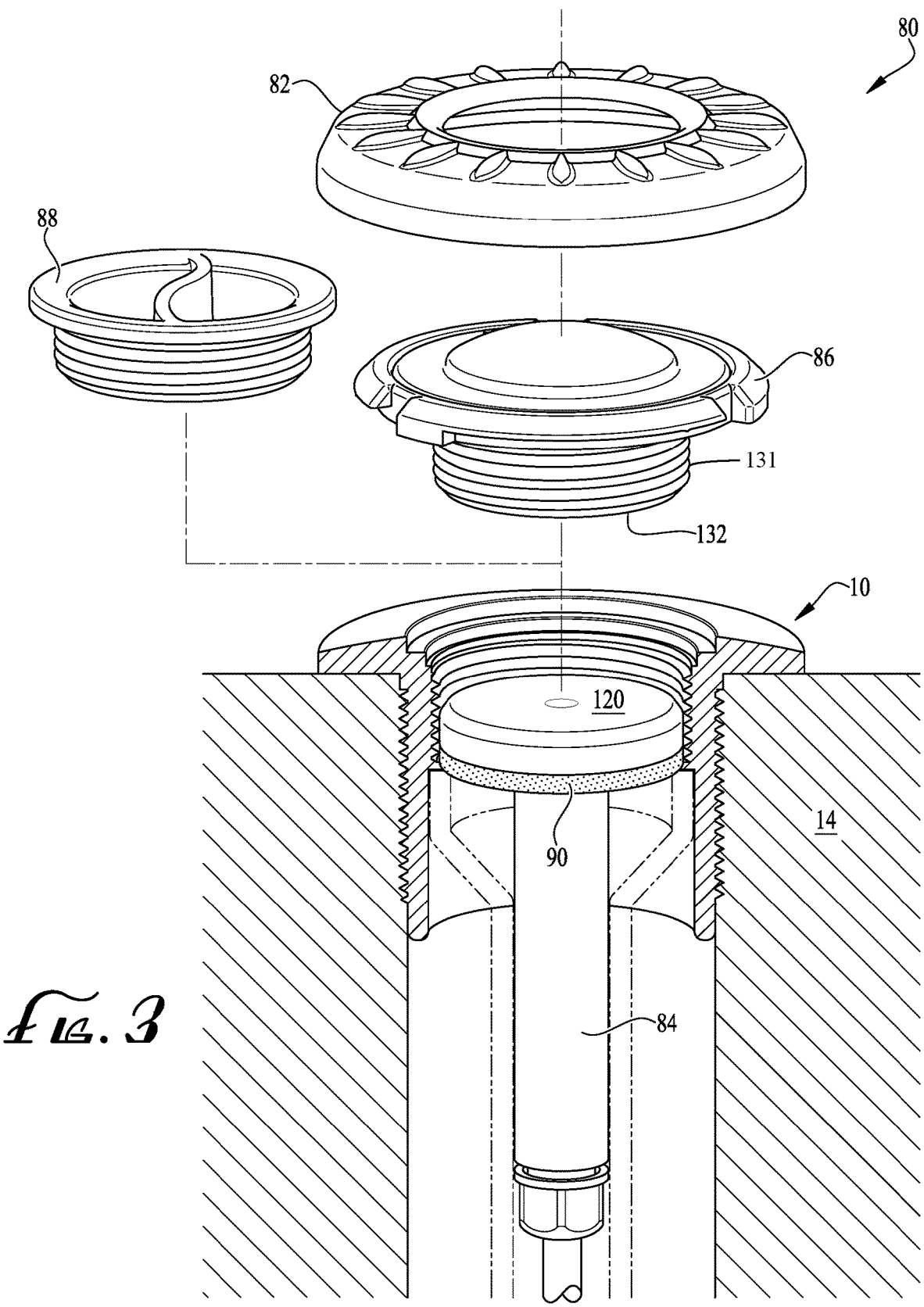
FIG. 3 shows a cross sectional side view of a standard wall fitting mounted in a wall showing a partly exploded view of an LED lighting device according to one embodiment of the present disclosure.
Figure 4:
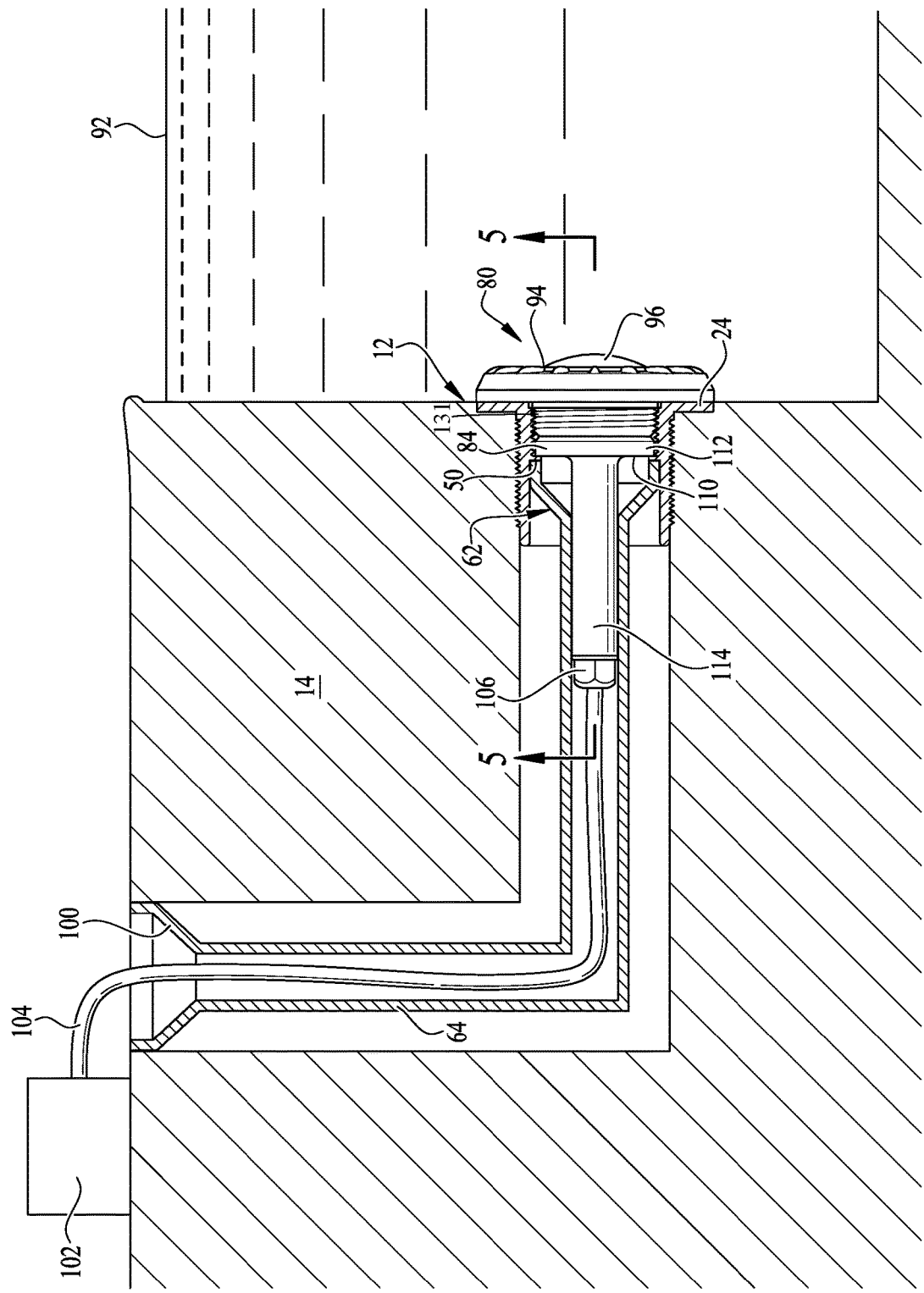
FIG. 4 shows a cross-sectional side view of an LED lighting device installed in a standard wall fitting according to one embodiment of the present disclosure.
Figure 5:
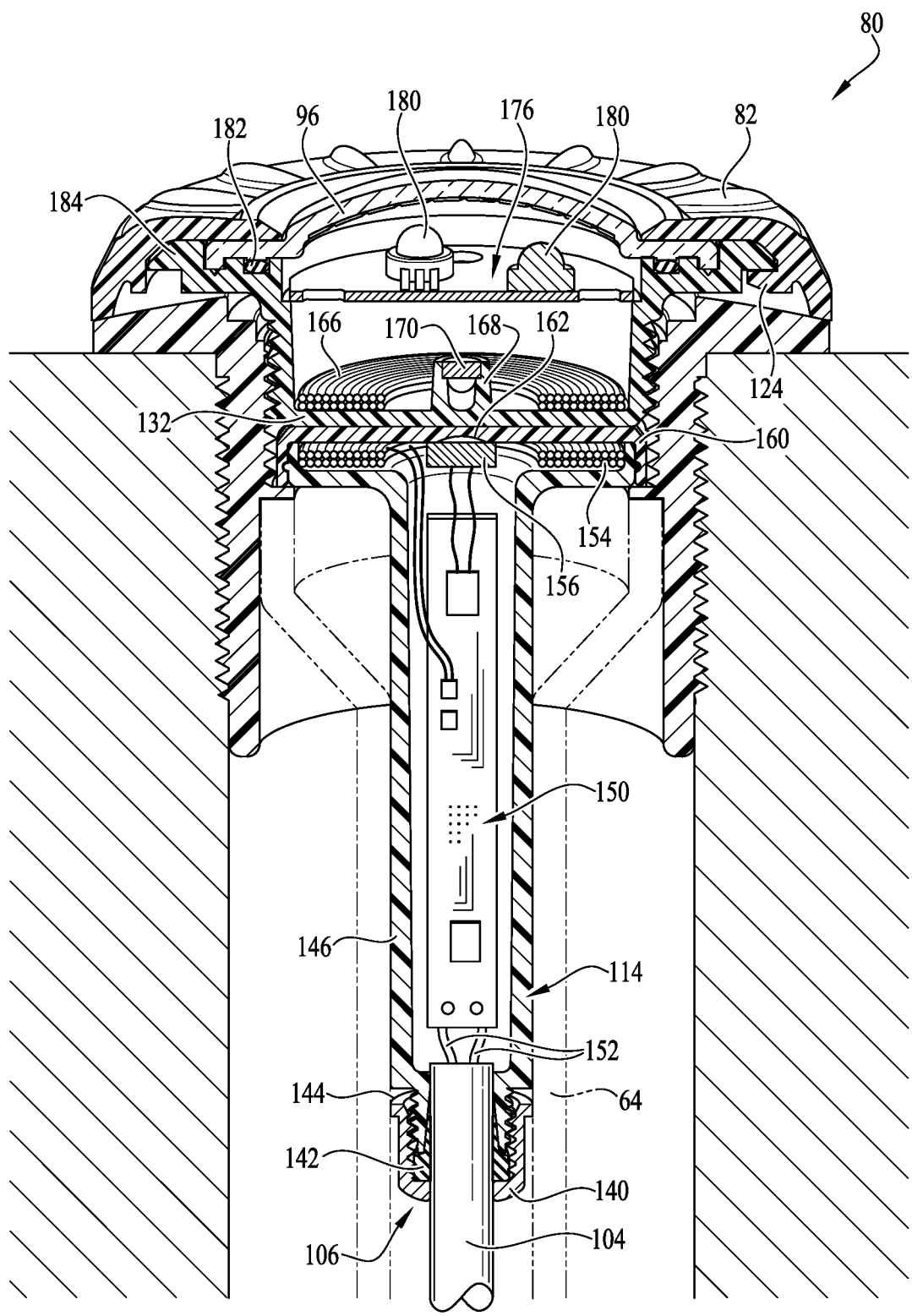
FIG. 5 shows a detailed cross-sectional side view of an LED lighting device according to one embodiment of the present disclosure.
Figure 12:
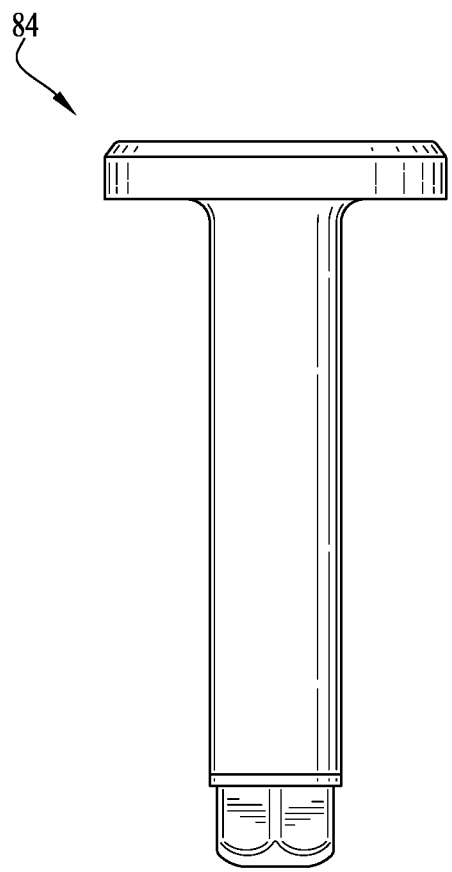
FIGS. 12 and 13 show side views of an inductive power emitter of an LED lighting device according to one embodiment of the present disclosure.
Figure 13:
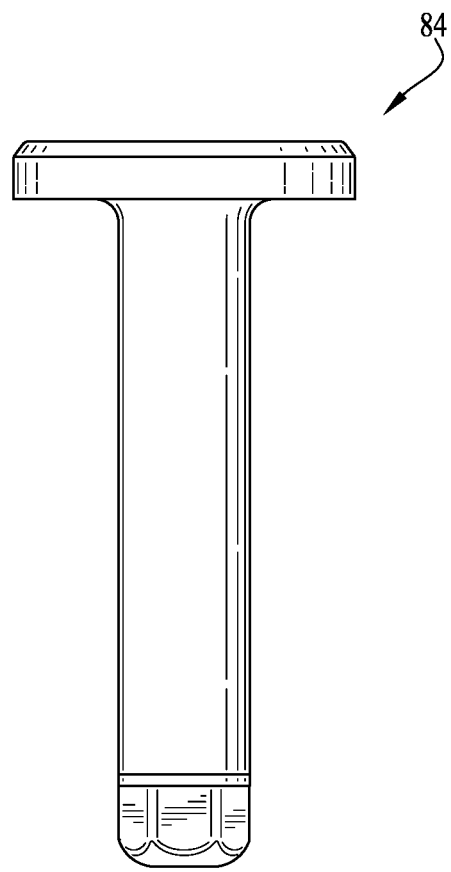
Figure 14:
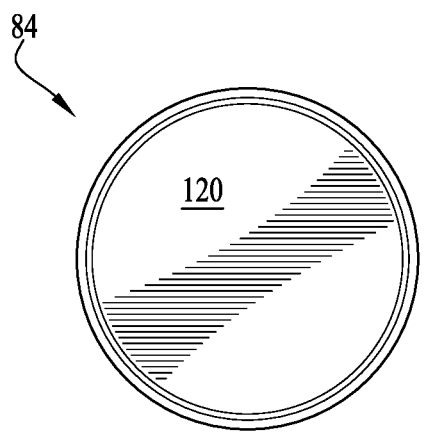
FIG. 14 shows a top plan view of an inductive power emitter of an LED lighting device according to one embodiment of the present disclosure.
Figure 15:
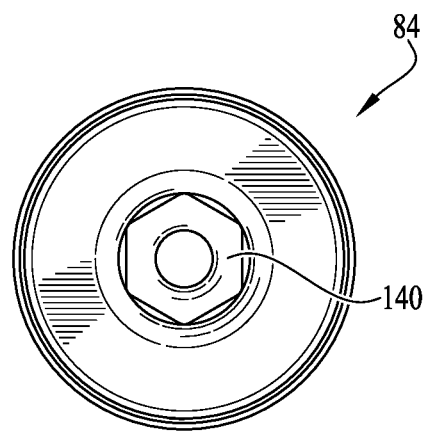
FIG. 15 shows a bottom plan view of an inductive power emitter of an LED lighting device according to one embodiment of the present disclosure.

FIGS. 3-5 show a basic embodiment of an LED lighting device 80 for use in a high-moisture environment, such as in swimming pools, water features, ponds, spas, and other like high-moisture environments. Embodiments of the LED lighting device 80 disclosed herein advantageously enable installation and repair of the LED lighting device 80 without requiring draining of water in the high-moisture environment. Further, embodiments herein enable installation of the LED lighting device 80 into various types of a standard wall fitting 10 without requiring substantial modification of the standard wall fitting 10 or a pool or other feature on which the standard wall fitting 10 is installed.

The LED lighting device 80 includes a decorative trim plate 82, a tee-shaped inductive power emitter 84 (also referred to as a power coupler), and an LED lamp module (or lamp) 86. The LED lamp module 86 acts as an inductive power receiver with respect to the inductive power emitter 84 such that the LED lamp module 86 is wirelessly powered by the inductive power emitter 84.

Figure 2:
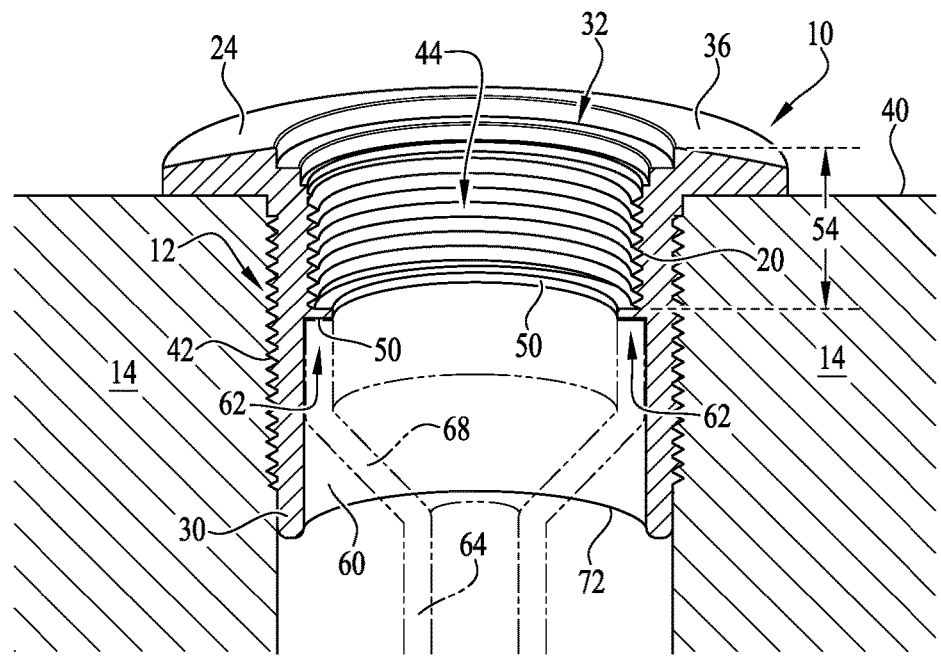
FIG. 2 shows a cross-sectional side view of a standard wall fitting installed on a pool wall.

Referring to FIG. 3, a cross-sectional side view of the standard wall fitting 10 mounted in a pool wall 14. FIG. 3 further illustrates a partly exploded view of the LED lighting device 80 including an inductive power supply installed in the standard wall fitting 10 for providing wireless power transfer from the inductive power emitter to the LED lamp module 86 within a confined space, such as within a face-to-stop distance 54 (FIG. 2) of the standard wall fitting 10. In one embodiment, a plug 88 is provided that may be installed in place of the LED lamp module 86. A spacer 90 is optionally provided on the inductive power emitter 84 as described in greater detail below.

Referring now to FIG. 4, existing pool lights are typically installed at least 18 inches (450 mm) below a water level 92 (per NEC Article 680.23 (5)) unless listed and identified for use at lesser depths. The LED lighting device 80 is preferably listed and identified for use at depths of from about no less than four inches (100 mm) below the normal water level 92 and up to about 36 inches below the normal water level 92, however it is also understood that a depth rating of the LED lighting device 80 may vary based on an intended installation location of the LED lighting device 80.

Prior to installation of the LED lighting device 80, the standard wall fitting 10 is installed in the pool wall 14. The standard wall fitting 10 is preferably selected from one of various available and suitable standard wall fittings, such as those listed in Table 1 below.

TABLE 1

| Brand | Part No. | Type | face-to-stop depth (inches) | Spacer? |
|---|---|---|---|---|
| S.R. Smith | LNS-2G | gunite | 0.89 | No |
| S.R. Smith | LNS-2A | fiberglass | 0.89 | No |
| S.R. Smith | LNS-2V | vinyl liner | 1.14 | Yes |
| S.R. Smith | LNS-2GI | gunite (flangeless) | 0.82 fitting only, 0.89 plaster-to-stop required | No |
| Pentair | 542404 | gunite | 0.89 | No |
| Pentair | 542402 | gunite | 0.93 | No |
| Pentair | 542414 | fiberglass | 0.91 | No |
| Pentair | 542429 | vinyl liner | 0.92 | No |
| Pentair | 86205100 | vinyl liner | 1.26 | Yes |
| Hayward | SP1022S | gunite | 0.92 | No |
| Hayward | SP1022 | gunite | 0.94 | No |

TABLE 1-continued

| Brand | Part No. | Type | face-to-stop depth (inches) | Spacer? |
|---|---|---|---|---|
| Hayward | SP2023S | fiberglass | 0.92 | No |
| Hayward | SP1408A | vinyl liner | 1.21 | Yes |

For example, the standard wall fitting 10 is an LNS-2G, LNS-2A, LNS-2V, or similar 1.5 inch (3.81 cm) fitting installed into the pool wall 14 at a desired location. The conduit 64 extends from the wall fitting 10 to a conduit termination 100. The conduit termination 100 is preferably located above ground (such as above the normal water level 92) as shown in FIG. 4. The conduit termination 100 is preferably near electrical supply equipment 102 providing power, such as 12 VAC, through an electrical supply cable 104. The PVC conduit 64 is watertight, and the electrical supply cable 104 is waterproof to prevent incursion of water. The electrical supply cable 104 may be provided pre-connected to a wire-cord end 106 of the inductive power emitter 84.

During installation, the wire cord end 106 of the inductive power emitter 84 may be inserted into the central aperture 32 of the standard wall fitting 10 such that the wire-cord end 106 is inserted from a direction of the face 24 of the standard wall fitting 10 to determine whether a full length of the inductive power emitter 84 may fit within the standard wall fitting 10 (including the free end 62 of the conduit 64. If an underside surface 110 (or the optional spacer 90) of a tee top 112 of the inductive power emitter 84 contacts the annular stop 50 of the standard wall fitting 10, there is no interference from an inside diameter (ID) of the threaded interior section 20 of the standard wall fitting 10 with the inductive power emitter 84. Interference may be attributable to injection molding tolerances of the standard wall fitting 10 and can subsequently be addressed, such as by careful application of medium grit sandpaper or a sanding drum on a rotary tool.

Referring again to Table 1 above, the face-to-stop distance 54 (FIG. 2) of the standard wall fitting 10 is checked. If the face-to-stop distance 54 is between about 0.89 (2.26 cm) and 1.0 inches (2.54 cm), then the optional spacer 90 (FIG. 3) may not be required and may be discarded. If the face-to-stop distance 54 of the standard wall fitting 10 is greater than about 1 inch (2.54 cm), then the optional spacer 90 is located on a stem 114 (FIG. 4) of the inductive power emitter 84 such that the optional spacer 90 is located between the annular stop 50 of the standard wall fitting 10 and the underside surface 110 of the tee top 112 of the inductive power emitter 84 when the inductive power emitter 84 is installed on the standard wall fitting 10. The optional spacer 90 may be formed of a resiliently flexible material, such as foam rubber. While the above describes specific dimensions for use of the optional spacer 90, it is understood that those dimensions may vary and one will appreciate that sizes may vary for use of the optional spacer 90 with installation of the inductive power emitter 84 on the standard wall fitting 10.

During installation, the wire-cord end 106 is inserted into the standard wall fitting 10 and the electrical supply cable 104 is fed through the conduit 64 to the electrical power supply equipment 102 as shown in FIG. 4. The electrical supply cable 104 may be pulled such that a flat inductive power-transfer face 120 (FIG. 3) of the inductive power emitter 84 is generally flush with the face 24 (FIG. 2) of the standard wall fitting 10.

Referring to FIGS. 6-8, a desired style of the decorative trim plate 82 is selected and secured to the LED lamp module 86. The decorative trim plate 82 may be installed by aligning spaced-apart tabs 124 located around an underside of the decorative trim plate 82 with corresponding notches 128 located around an outer circumference of the LED lamp module 86, as shown in FIGS. 6 and 7. The LED lamp module 86 is rotated with respect to the decorative trim plate 82 until the spaced-apart tabs 124 of the decorative trim plate 82 contact spaced-apart stops 130 (FIG. 8) of the LED lamp module 86 such that the LED lamp module 86 and decorative trim plate 82 are subsequently secured to one another.

Figure 1:
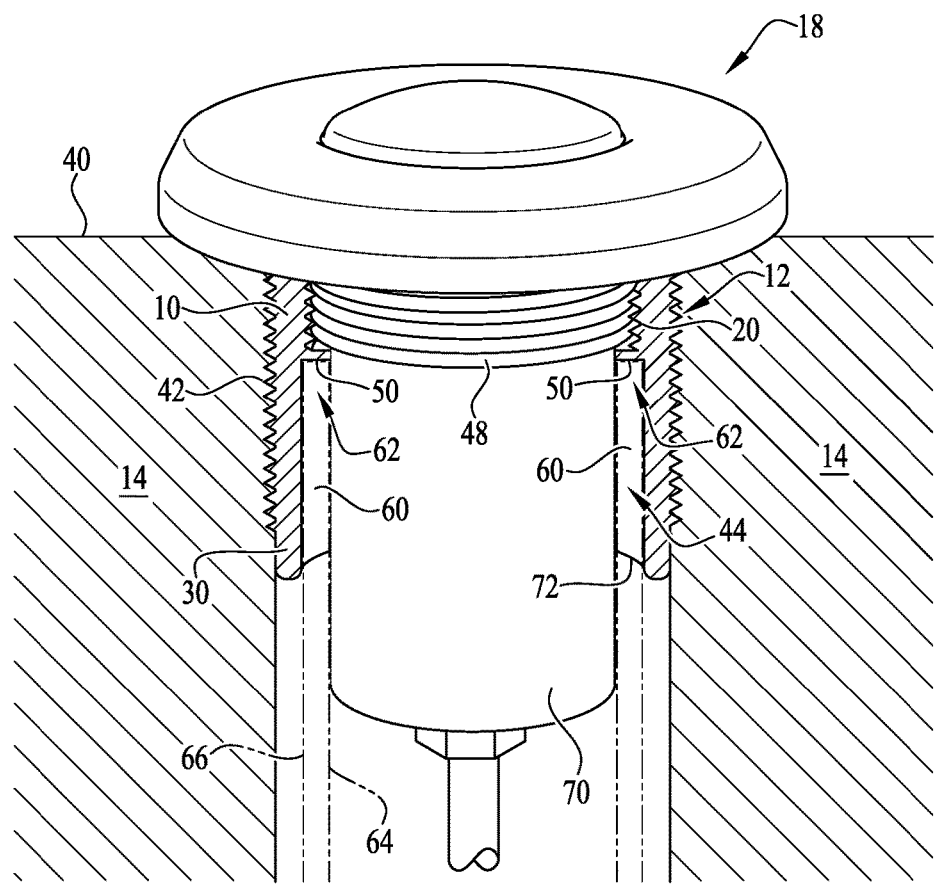
FIG. 1 shows an example of a conventional pool lighting device installed on a standard wall fitting.

The LED lamp module 86 and attached decorative trim plate 82 are installed on the standard wall fitting 10. A threaded male portion 131 (FIG. 3) of the LED lamp module 86 is aligned with the central aperture 32 of the standard wall fitting 10. The threaded male portion 131 of the LED lamp module 86 is threadably engaged with the threaded interior section 20 of the standard wall fitting 10 (FIG. 1) such that the LED lamp module 86 and attached decorative trim plate 82 are threadably secured to the standard wall fitting 10. The decorative trim plate 82 may have a diameter that is larger than an outer diameter of the LED lamp module 86, thereby making the decorative trim plate 82 easier to grip to tighten or loosen the LED lamp module 86 from the standard wall fitting 10. In this way, the decorative trim plate 82 also serves as a tool to apply torque to LED lamp module 86.

As the threaded male portion 131 of the LED lamp module 86 engages the standard wall fitting 10, an inductive power-receiver pad 132 of the LED lamp module 86 including a flat surface formed thereon is drawn towards the flat inductive power-transfer face 120 of the inductive power emitter 84. The inductive power receiver pad 132 of the LED lamp module 86 may contact the inductive power-transfer face 120 of the inductive power emitter to further urge the inductive power emitter 84 into the standard wall fitting 10 and until the inductive power emitter 84 may contact the annular stop 50 of the standard wall fitting 10. Thus, a depth of the inductive power emitter 84 within the standard wall fitting 10 may be determined by a position of the threaded male portion 131 of the LED lamp module 86 threadably engaged with the standard wall fitting 10. While the above embodiment describes contact of the inductive power-receiver pad 132 with the inductive power-transfer face 120, it is also understood that a gap may exist between the inductive power-receiver pad 132 and the inductive power-transfer face 120.

Referring now to FIG. 5, a cross-sectional side view of the LED lighting device 80 is shown. The electrical power supply cable 104 is secured to the wire-cord end 106 by a nut 140 that tightens a gasket 142 around the power supply cable 104. An o-ring 144 seals a gap formed between the nut 140 and a circuit board housing 146 defining the stem 114 of the inductive power emitter 84. A circuit board 150 and associated circuitry are mounted within the circuit board housing 146. The circuit board housing 146 may have a diameter such that the circuit board housing 146 fits within a narrower width of the conduit 64.

The circuit board 150 and associated circuitry may include hardware resources including an optional microcontroller, power transformer, and power and signal transmission components. As described in greater detail herein, the circuit board 150 receives power, such as 12 VAC power, and optional control signals communicated through wires 152, transforms the power for efficient wireless (i.e., contactless) transmission through an inductive transmitter coil 154, and optionally converts from electrical to optical control signals for data transmission through an infrared (IR) emitter 156.

The inductive transmitter coil 154 includes wire wound circumferentially about, and radially extending away from, a longitudinal axis of stem 114. The inductive transmitter coil 154 defines a plane that is generally parallel with that defined by a tee-cap 160 of the inductive power emitter 84, which forms flat inductive power-transfer face 120 (see, e.g., FIG. 9) of the inductive power emitter 84. The tee-cap 160 further includes a centrally located shallow internal depression 162 for efficiently conveying through the cap 160 IR light from the IR emitter 156. FIGS. 9-15 show additional views of the inductive power emitter 84.

An exterior surface of the flat inductive power transfer face 120 of the inductive power emitter 84 is located proximate to or in contact with a surface of the inductive power-receiver pad 132 of the LED lamp module 86 when the inductive power emitter 84 and the LED lamp module 86 are installed on the standard wall fitting 10. The inductive power-receiver pad 132 includes an inductive receiver coil 166 located within the inductive power-receiver pad 132. The inductive receiver coil 166 includes wire wound and arranged in a manner similar to the wire of the inductive transmitter coil 154. The inductive transmitter coil 154 and the inductive receiver coil 166 are therefore oriented such that a plane of the inductive transmitter coil 154 is substantially parallel to a plane of the inductive receiver coil 166. The inductive receiver coil 166 is wound circumferentially about, and radially extends away from, a longitudinal axis of an internal IR receiver mounting cradle 168. The IR receiver mounting cradle 168 includes an IR receiver 170 (also referred to as an IR detector) arranged to wirelessly detect IR signals from the IR emitter 156.

Figure 16:
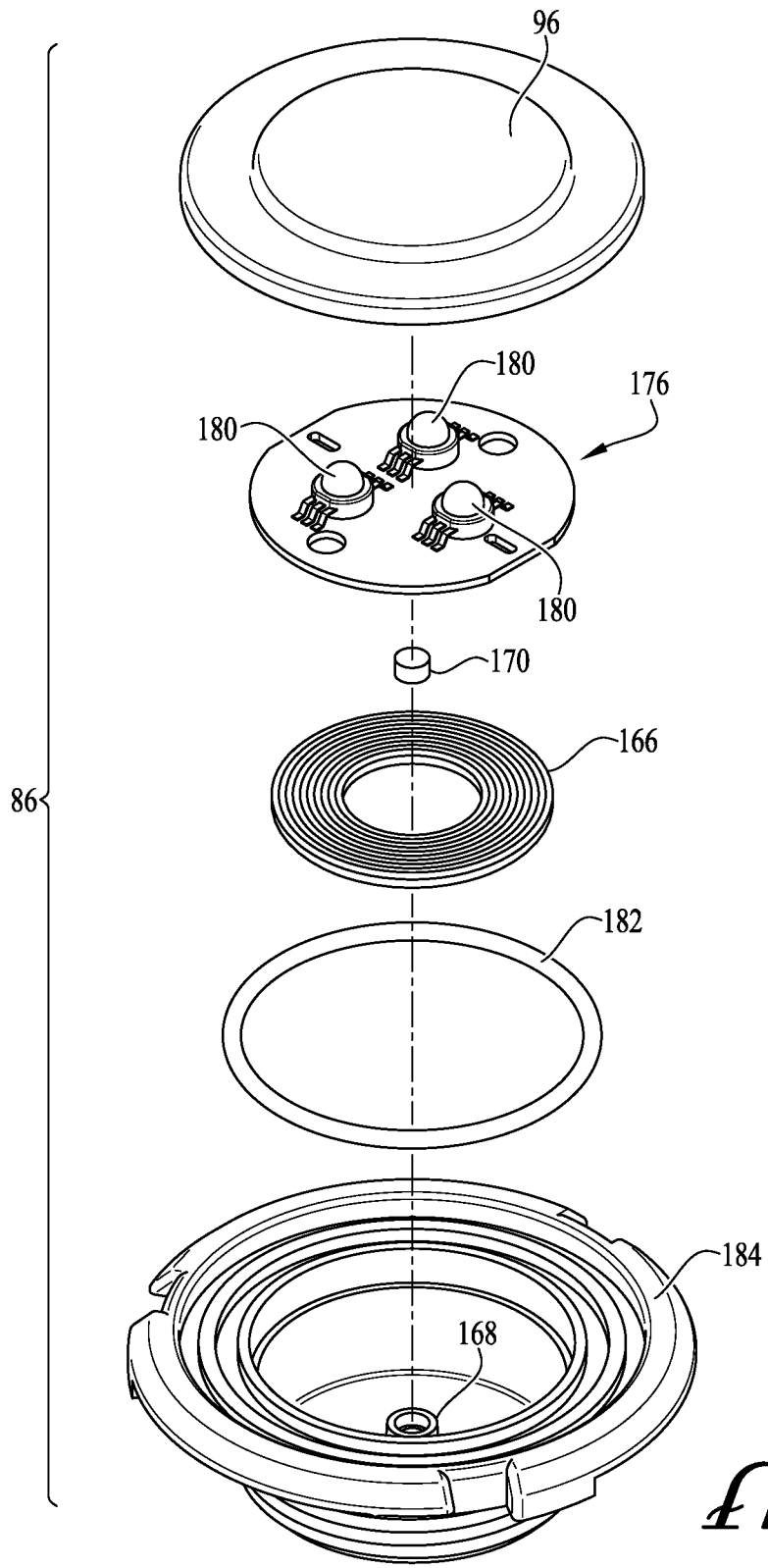
FIG. 16 shows an exploded view of an LED lamp module of an LED lighting device according to one embodiment of the present disclosure.
Figure 17:
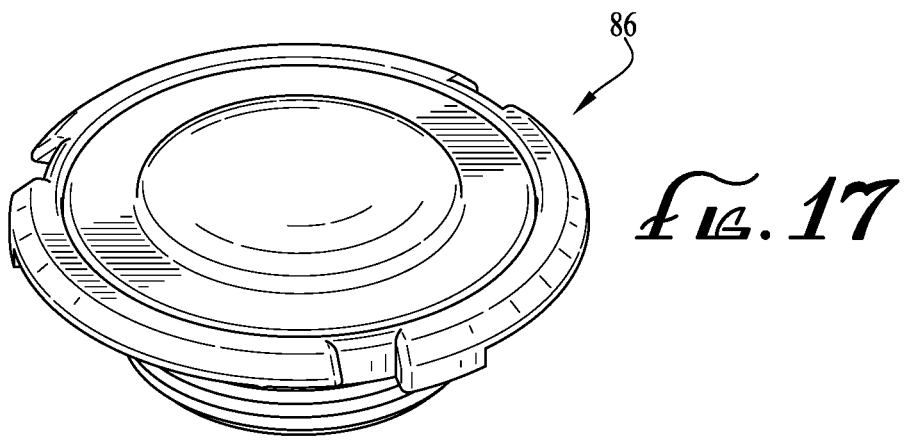
FIG. 17 shows a top perspective view of an LED lamp module of an LED lighting device according to one embodiment of the present disclosure.
Figure 18:
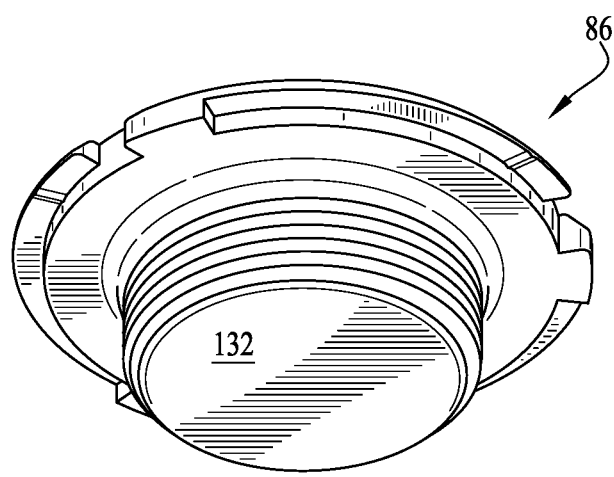
FIG. 18 shows a bottom perspective view of an LED lamp module of an LED lighting device according to one embodiment of the present disclosure.
Figure 19:
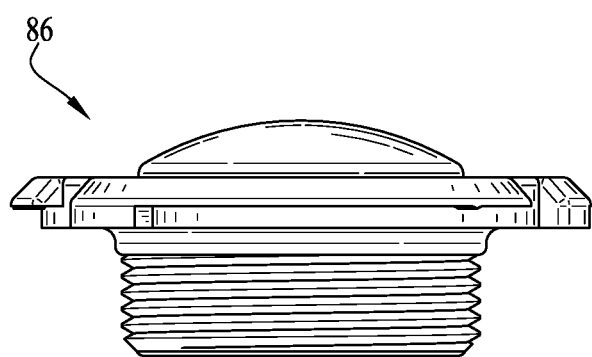
FIGS. 19-22 show side views of an LED lamp module of an LED lighting device according to one embodiment of the present disclosure.
Figure 20:
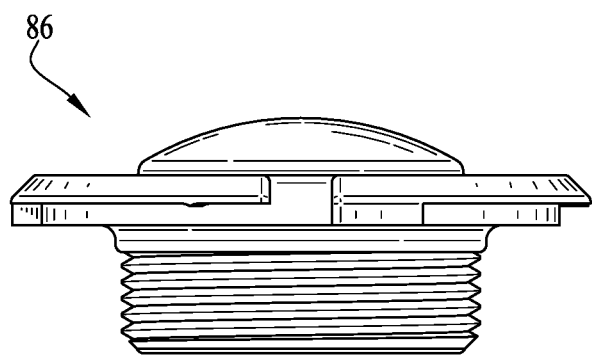
Figure 21:
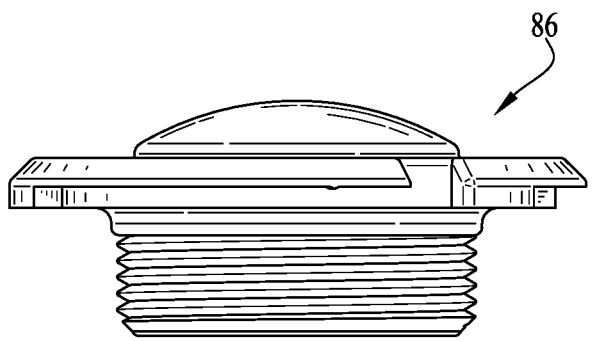
Figure 22:
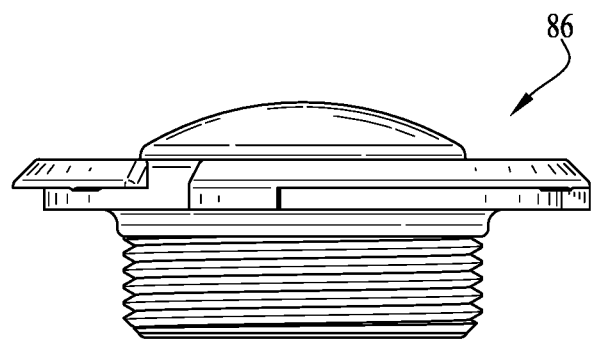
Figure 23:
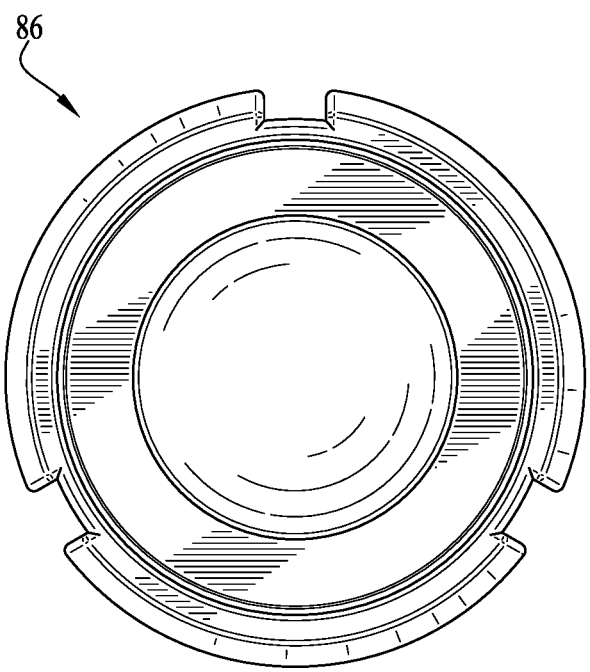
FIG. 23 shows a top plan view of an LED lamp module of an LED lighting device according to one embodiment of the present disclosure.
Figure 24:
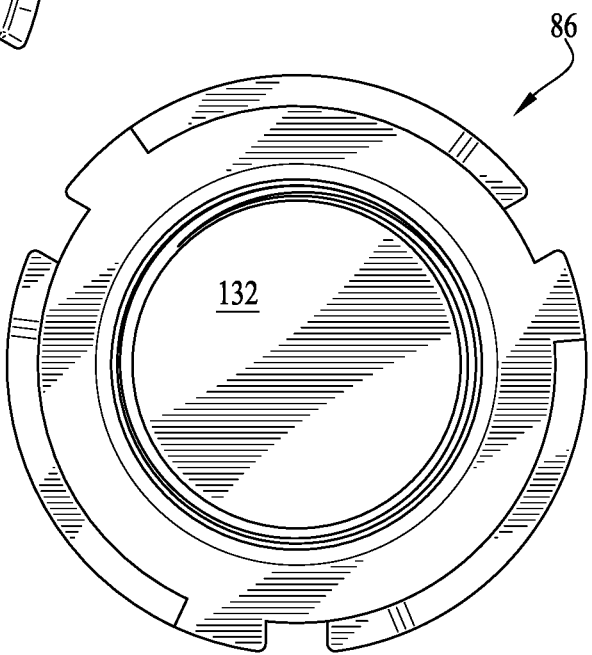
FIG. 24 shows a bottom plan view of an LED lamp module of an LED lighting device according to one embodiment of the present disclosure.
Figure 25:
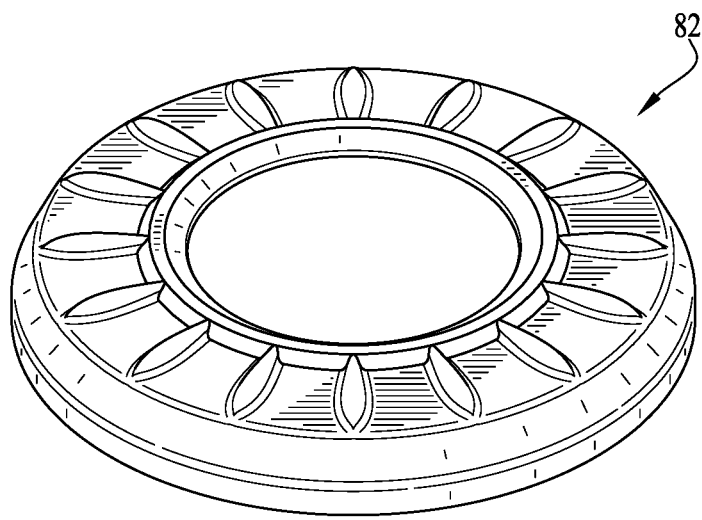
FIG. 25 shows a top perspective view of a first decorative trim plate according to one embodiment of the present disclosure.
Figure 26:
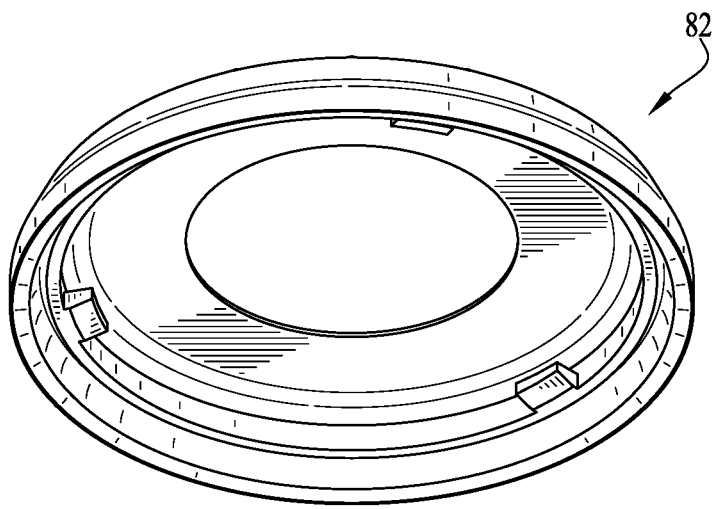
FIG. 26 shows a bottom perspective view of a first decorative trim plate according to one embodiment of the present disclosure.
Figure 27:
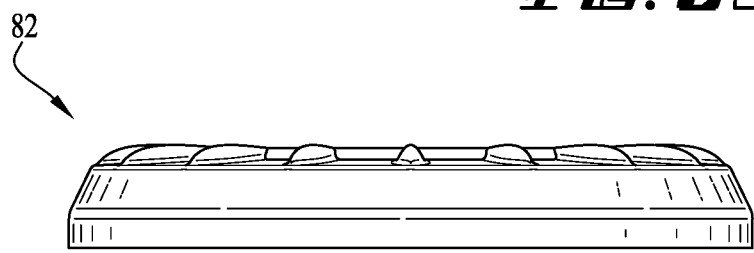
FIG. 27 shows a side view of a first decorative trim plate according to one embodiment of the present disclosure.
Figure 28:
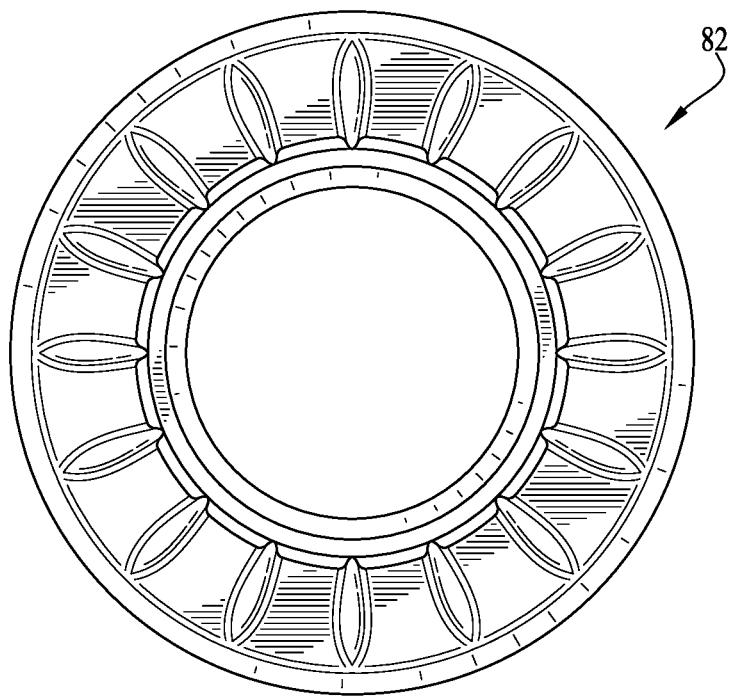
FIG. 28 shows a top plan view of a first decorative trim plate according to one embodiment of the present disclosure.
Figure 29:
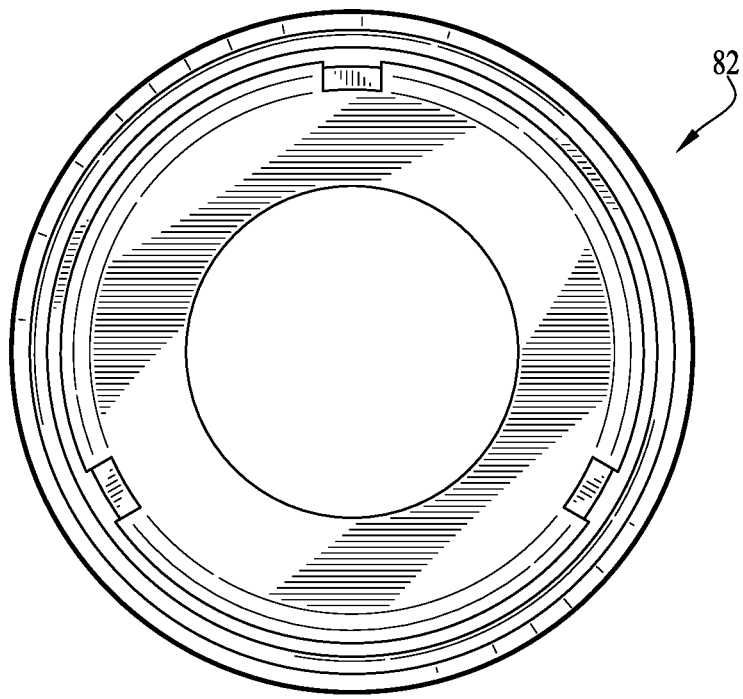
FIG. 29 shows a bottom plan view of a first decorative trim plate according to one embodiment of the present disclosure.
Figure 30:
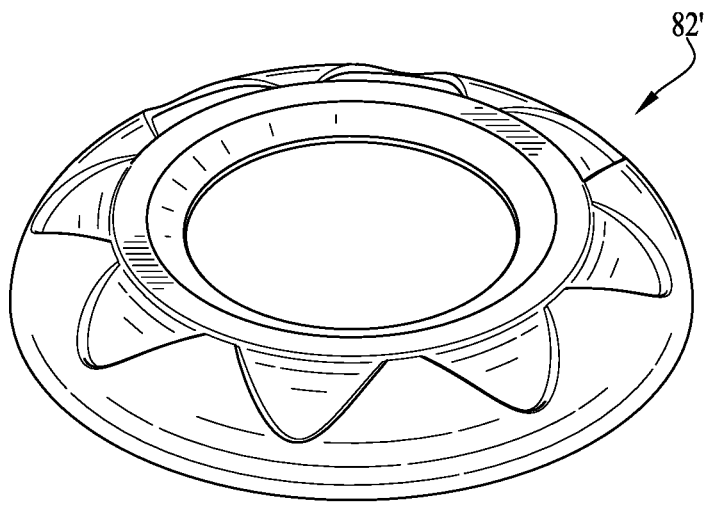
FIG. 30 shows a top perspective view of a second decorative trim plate according to one embodiment of the present disclosure.
Figure 31:
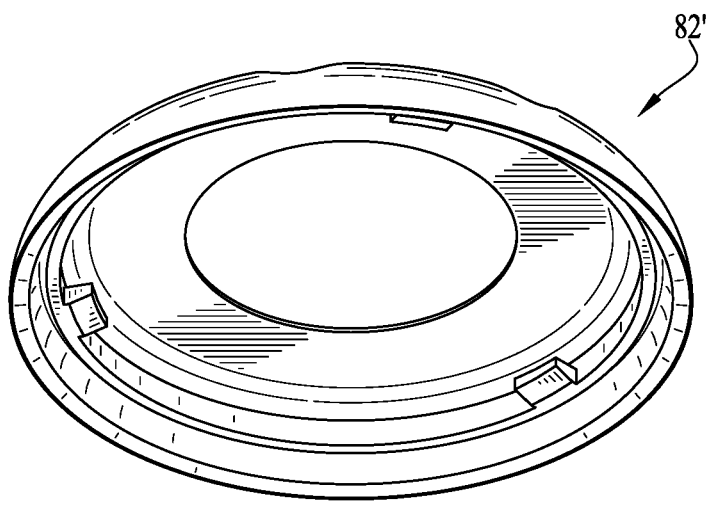
FIG. 31 shows a bottom perspective view of a second decorative trim plate according to one embodiment of the present disclosure.
Figure 32:
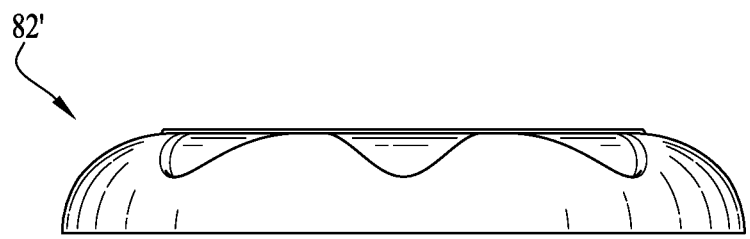
FIG. 32 shows a side view of a second decorative trim plate according to one embodiment of the present disclosure.
Figure 33:
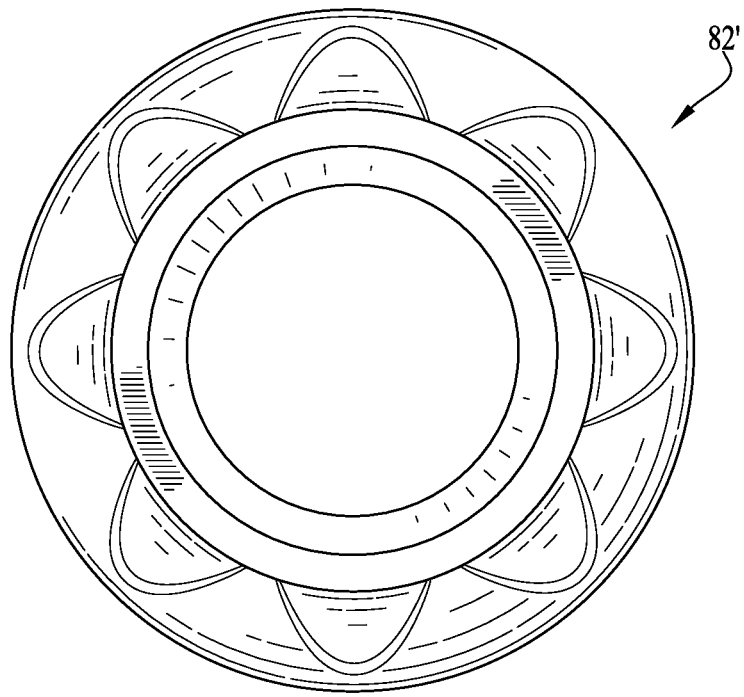
FIG. 33 shows a top plan view of a second decorative trim plate according to one embodiment of the present disclosure.
Figure 34:
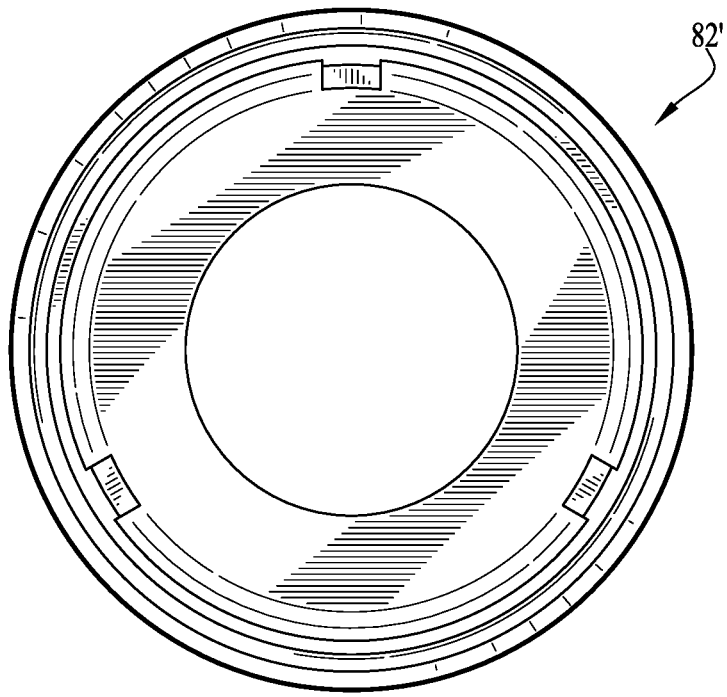
FIG. 34 shows a bottom plan view of a second decorative trim plate according to one embodiment of the present disclosure.
Figure 35:
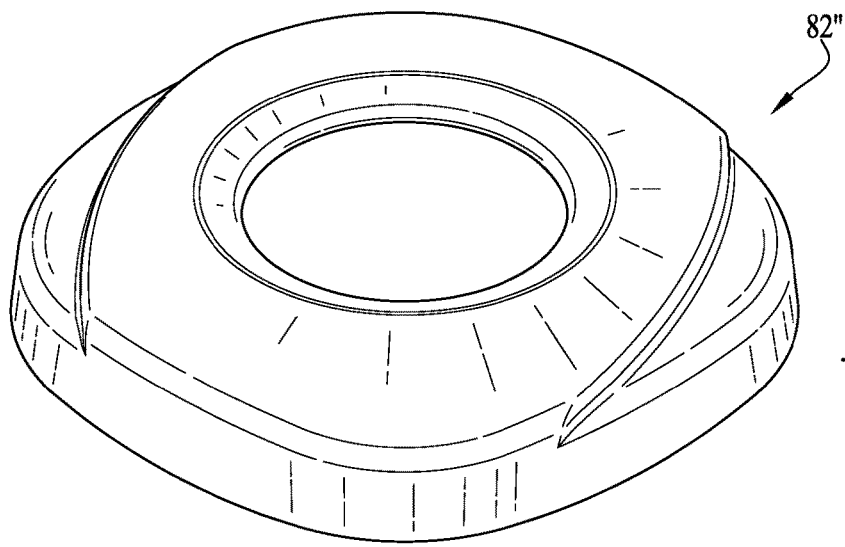
FIG. 35 shows a top perspective view of a third decorative trim plate according to one embodiment of the present disclosure.
Figure 36:
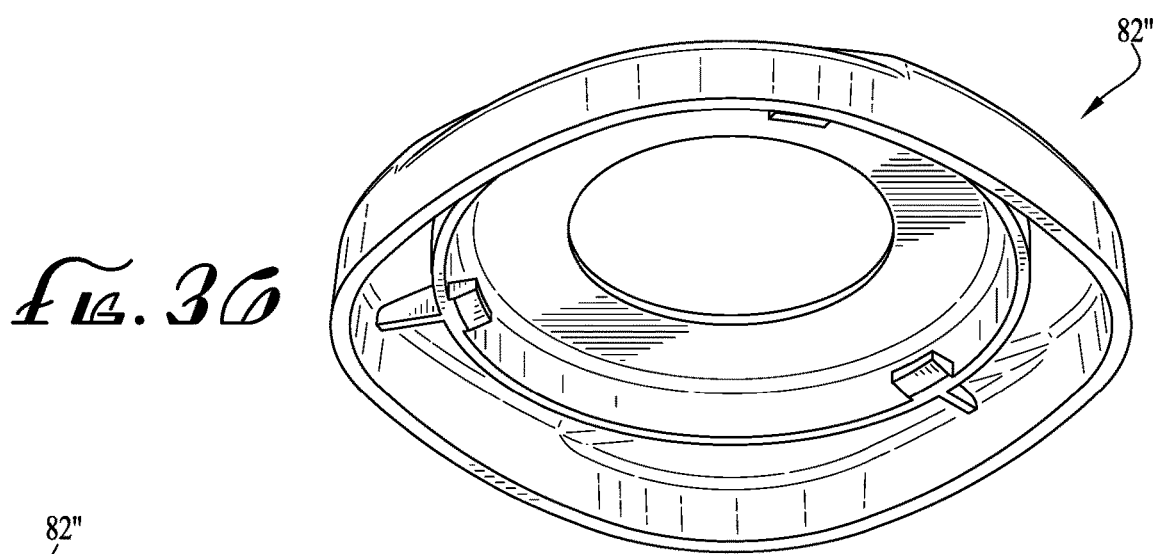
FIG. 36 shows a bottom perspective view of a third decorative trim plate according to one embodiment of the present disclosure.
Figure 37:
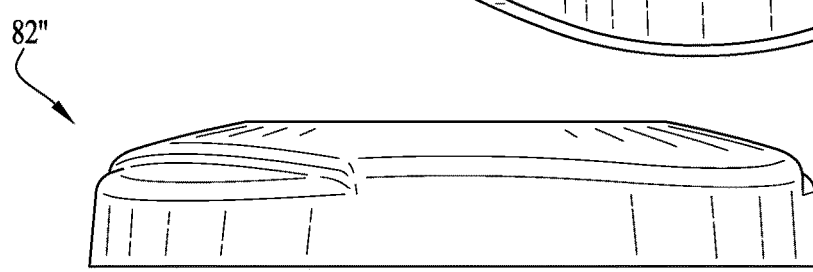
FIGS. 37-38 show side views of a third decorative trim plate according to one embodiment of the present disclosure.
Figure 38:
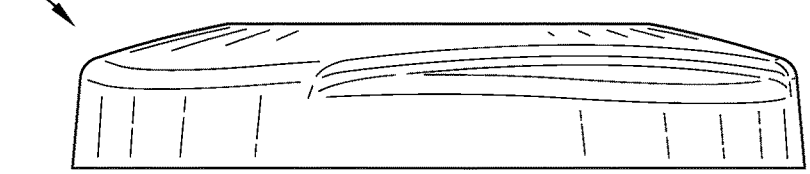
Figure 39:
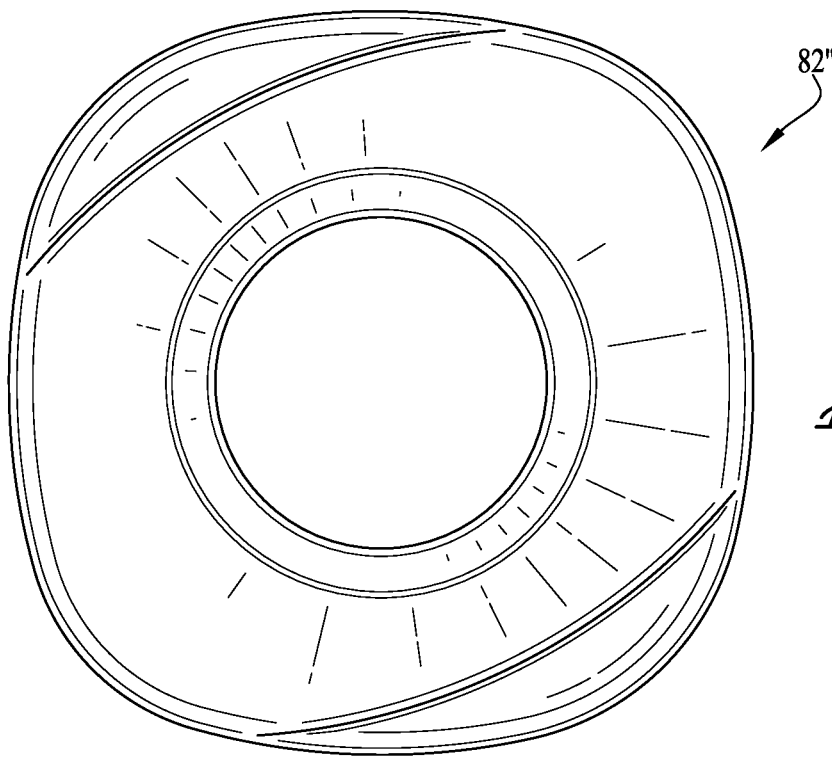
FIG. 39 shows a top plan view of a third decorative trim plate according to one embodiment of the present disclosure.
Figure 40:
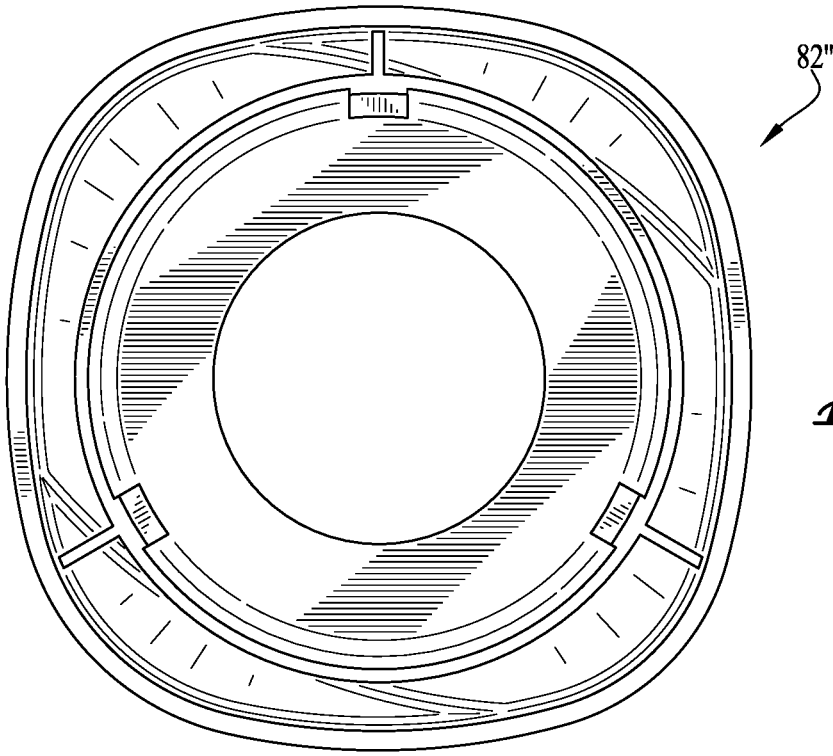
FIG. 40 shows a bottom plan view of a third decorative trim plate according to one embodiment of the present disclosure.

A circuit board 176 and associated circuitry of the LED lamp module 86 is mounted on an annular shelf. The circuit board 176 and associated circuitry includes inductively powered power supply circuitry, LED color and brightness control circuitry, and RGB LEDs 180 that emit colored light through a lens 96 (FIG. 16) of the LED lamp module 86. For example, the circuit board 176 and associated circuitry of the LED lamp module may include an optional microcontroller and associated non-transient machine readable memory, a power transformer, and one or more multi-color channel LED driver integrated circuits (ICs) that employ pulse-width modulation (PWM) dimming.

A gasket 182 seals the lens 96 to a body 184 of the LED lamp module 86. The lens 96 and the body 184 seal and encase the circuit board 176 and associated circuitry of the LED lamp module 86 to form a replaceable modular lighting component. Further, inductive power of the LED lamp module 86 reduces a risk of electrical shock when installing or replacing the LED lamp module 86 when the LED lamp module 86 is located underwater. FIGS. 16-24 show additional views of the LED lamp module 86 and components thereof.

The LED lamp module 86 may further include a thermal protection circuit as part of the circuit board 176 and associated circuitry such that if the LED lamp module 86 is detected as being too hot for a particular operating environment, a brightness of the LED lamp module 86 is reduced in increments until the LED lamp module 86 is determined to be below a designated thermal threshold.

The trim plate 82 may be provided in a variety of available ornamental designs and configurations, such as those shown in FIGS. 25-29. A first embodiment of the trim plate 82 is shown in FIGS. 25-29. FIGS. 30-34 illustrate a second embodiment of an appearance of a trim plate 82'. FIGS. 35-40 illustrate a third embodiment of an appearance of a trim plate 82" according to embodiments herein.

The RGB LEDs 180 are controllable to produce various color modes, which may include solid color light displays at various brightness levels. More generally, show modes (or modes) include color modes as well as predetermined temporal transitions between one or both of color and brightness modes of the RGB LEDs. For example, a show mode may include gradually shifting colors while optionally changing brightness, strobing between colors, or other combinations of color and timing schemes. Table 2 below provides examples of modes according to embodiments herein.

TABLE 2

COLOR MODE SELECTION GUIDE

| Mode 1 | Soft Color Change |
|---|---|
| Mode 2 | White |
| Mode 3 | Blue |
| Mode 4 | Green |
| Mode 5 | Red |
| Mode 6 | Amber |
| Mode 7 | Magenta |
| Mode 8 | Flash (Strobe) Color Change |

In some embodiments, selection of a mode is advanced sequentially until a desired mode is selected. Mode selections may be cycled from Mode 1 through Mode 8 and back to Mode 1.

Sequences may vary depending on manufacturers. For example, Table 2 above shows an exemplary sequence of blue, green, and then red modes. Alternatively, a sequence may vary such as a sequence of red, green, and then blue as modes are cycled. Accordingly, the LED lamp module 86 may be configured to use various sequences. In one embodiment, sequence configuration is achieved through an IR command, e.g., a data command that includes a sequence option, such as option number one for the sequence of Table 2 saved in memory, option number two for a Pentair sequence (not shown) saved in memory, and so forth. A sequence saved in memory may be recalled based on a number of the desired sequence that may be selectable via the IR interface or other communication means, such as toggling on or off and described below.

In another embodiment, a sequence of the RGB LEDs 180 is programmed through IR commands such that any sequence may be downloaded to the LED lamp module 86. For example, sequence configuration commands may include a show number, RGB values for a new show mode, static or dynamic brightness information, and other types of information such as timing and when to cycle another show mode.

In one embodiment, a separate sequencer programmer having an IR emitter is used to provide IR commands that select or define a sequence. In other embodiments, the inductive power emitter 84 or LED lamp module 86 include one or more user interfaces (such as a waterproof membrane button) for programming or selecting a desired sequence based on input received via the user interface.

Embodiments herein are capable of accommodating various sequences such that behavior across a multi-light system may be synchronized. When all lights in the multi-light system are configured to use a desired sequence, such as a sequence shown in Table 2 above, then cycling to a next mode in the sequence will result in the same mode being selected for each light in the multi-light system. To synchronize lights of the multi-light system, lights of the multi-light system are turned on to confirm that color modes of the lights are out of synchronism. Next, lights are turned off for five seconds or more. Lights are toggled on/off three times within three seconds and end in an off condition. Lights are left off for five seconds and subsequently turned on to confirm that all lights are in the first mode, e.g., soft color change in Table 2 or a pre-set first mode from a different selected sequence.

Other embodiments include varying types of signals for changing show modes of the LED lamp module 86, such as off/on power switching signals, IR signals, and combinations thereof.

In one embodiment, shows are controllable in response to off/on power switching commands, which may be power-cycling commands. For example, each time power is quickly cycled, a show mode of the LED lamp module 86 is indexed to another mode once power transfer resumes. When power is withheld for a sufficiently long duration, instead of indexing the show mode, a memory function of the LED lamp module recalls the last show mode to generate when power transmission resumes. For example, if the mode was last a blue mode, then the next time the light is activated it will once again be in blue mode. To change to the next show mode, the power is then quickly (such as within one second or faster) toggled.

In another embodiment, the IR emitter 156 generates pulsed IR light that is received by the IR receiver 170. Pulses of IR light represent bits in a data stream or packet so as to form a serial data transmission protocol. In another embodiment, pulse widths, duty cycle, or frequency are modulated to represent various show modes or other commands.

In one embodiment, certain show modes may be indexed by power cycling whereas commands for modifying attributes of the show are conveyed using IR light or vice versa. For example, a show mode may be selected by power cycling whereas brightness or dimming controls for the show are separately controllable through the IR interface.

It may be appreciated that, before commands are transmitted to the LED lamp module 86, they may be signaled through the electrical supply cable 104, such as by power cycling or other modulation scheme such as frequency shift keying of a 12 VAC supply. Signals are then converted from the inductive power emitter 84 to the LED lamp module 86 as described herein. In other embodiments, signals may be wireless communicated, such as through Bluetooth Low Energy (BLE), Wi-Fi, or other types of wireless personal area network (WPAN) communications with the inductive power emitter 84 or the LED lamp module 86.

Embodiments disclosed herein provide a wireless LED lighting device 80 including the inductive power emitter 84 and the LED lamp module 86. The inductive power emitter 84 includes the inductive transmitter coil 154 located within the tee cap 160 of the inductive power emitter 84, the circuit board 150 and associated circuitry of the inductive power emitter 84, and the IR emitter 156. The LED lamp module 86 includes the body 184 of the LED lamp module 86 including the lens 96 secured thereon, the circuit board 176 and associated circuitry of the LED lamp module 86, the inductive receiver coil 166, the IR receiver 170 and the RGB LEDs 180. The circuit board 150 and associated circuitry of the inductive power emitter 84 is in electrical communication with a power source through the electrical supply cable 104 to receive external power and signals. Power is transmitted to the LED lamp module 86 for illumination of one or more of the RGB LEDs 180 through the cooperation between the inductive transmitter coil 154 of the inductive power emitter 84 and the inductive receiver coil 166 of the LED lamp module 86. An external signal, such as an infrared signal, is transmitted to the circuit board 176 and associated circuitry of the LED lamp module 86 through the cooperation between the IR emitter 156 of the inductive power emitter 84 and the IR receiver 170 of the LED lamp module 86. The infrared signal is received on the circuit board 176 and associated circuitry of the LED lamp module 86 to achieve control of the one or more RGB LEDs 180 of the LED lamp module 86. The inductive power transmitter 84 is substantially sealed when connected to the electrical supply cable 104, so that the inductive power transmitter 84 is substantially sealed. Further, LED lamp module 86 is similarly substantially sealed separate from the inductive power transmitter 84. In this way, power and any signals are transmitted wirelessly between the inductive power transmitter 84 and the LED lamp module 86, while the usage of any exposed wiring and contact is avoided, which makes the wireless swimming pool lamp convenient to install and replace, with a high safety performance and long service life. And due to the use of the infrared signal transmission, signal stability is increased.

Embodiments herein advantageously allow for the LED lighting device 80 to be installed in an environment, such as underwater at a swimming pool or other similar environments. Embodiments of the LED lighting device 80 are installable on existing standard wall fittings of a pool or other environment without requiring substantial modification of an installation location of the LED lighting device 80. Further, aspects of the LED lighting device allow for the LED lamp module 86 to be easily swapped, repaired, or replaced without requiring draining of water from the environment in which the LED lighting device is installed.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. An LED lighting device installable on a standard wall fitting having a cylindrical body, a threaded interior section located, and an annular stop located at an end of the threaded interior section, the LED lighting device comprising:
   an inductive power transmitter including
      a housing shaped to fit through the standard wall fitting, the housing having a first end and a second end,
      a tee top located at the first end of the housing including a flat inductive power transfer face located on an end thereof and an underside surface shaped to contact the annular stop of the standard wall fitting, and
      an inductive transmitter coil located within the tee top and arranged such that a plane of the inductive transmitter coil is substantially parallel to the flat inductive power transfer face of the tee top, the inductive transmitter coil in electrical communication with a power source; and
   an LED lamp module including
      an LED lamp body including an upper end and a lower end, the LED lamp body containing one or more LEDs,
      a threaded male portion formed on the lower end of the LED lamp body and shaped to threadably engage the threaded interior section of the standard wall fitting, the threaded male portion including a flat surface formed on an end thereof,
      an inductive power receiver pad located adjacent the flat surface of the threaded male portion, and
      an inductive power receiver coil located within the threaded male portion proximate to the inductive power receiver pad;
   wherein the tee top of the inductive power transmitter is configured to be located between the annular stop of the standard wall fitting and the inductive power-receiver pad of the LED lamp module.

2. The LED lighting device of claim 1, further comprising:
   an IR emitter located in the tee top of the inductive power transmitter and
   an IR receiver located in the LED lamp body of the LED lamp module;
   wherein the LEDs of the LED lamp module are controlled by signals detected by the IR receiver of the LED lamp module the IR emitter of the inductive power transmitter.

3. The LED lighting device of claim 2, further comprising:
   an internal depression located adjacent the flat inductive power transfer face of the inductive power transmitter and
   an IR receiver mounting cradle located adjacent the flat surface on the threaded male portion of the LED lamp module;
   wherein the IR emitter is located on the internal depression and the IR receiver is mounted on the mounting cradle; and
   wherein the IR receiver is located in visual alignment with the IR emitter when the LED lighting device is installed on the standard wall fitting.

4. The LED lighting device of claim 1, the LED lamp module further comprising a decorative trim plate removably installed on the LED lamp body.

5. The LED lighting device of claim 4, further comprising:
   a plurality of spaced-apart tabs located around an underside of the decorative trim plate;
   a plurality of notches located around an outer circumference of the LED lamp body;
   wherein the decorative trim plate is removably secured on the LED lamp body by aligning the plurality of spaced-apart tabs of the decorative trim plate with the plurality of notches of the LED lamp body and subsequently rotating the decorative trim plate with respect to the LED lamp body.

6. The LED lighting device of claim 1, further comprising a spacer located on the inductive power transmitter adjacent to the tee top, wherein the spacer is located between the tee top and the annular stop of the standard wall fitting when the LED lighting device is installed on the standard wall fitting.

7. The LED lighting device of claim 1, further comprising an electrical supply cable connected at a first end to electrical supply equipment and at a second end to the inductive power transmitter.

8. The LED lighting device of claim 1, wherein the LED lamp module is configured to be one of removed or installed on the standard wall fitting adjacent the inductive power transmitter when the standard wall fitting is located below a water level of an area at which the standard wall fitting is located.

9. The LED lighting device of claim 1, wherein the one or more LEDs of the LED lamp body are controllable to produce various color modes.

10. The LED lighting device of claim 3, wherein the one or more LEDs are controllable to produce various color modes, and wherein a sequence of the one or more LEDs is communicated from the IR emitter of the inductive power transmitter to the IR receiver of the LED lamp module.

11. The LED lighting device of claim 10, wherein one of the various color modes may be selected by a signal transmitted from the IR emitter of the inductive power transmitter to the IR receiver of the LED lamp module.

12. An LED lighting device installable on a standard wall fitting having a cylindrical body, a threaded interior section located, and an annular stop located at an end of the threaded interior section, the LED lighting device comprising:
    an inductive power transmitter including
        a housing shaped to fit through the standard wall fitting, the housing having a first end and a second end,
        a tee top located at the first end of the housing including a flat inductive power transfer face located on an end thereof and an underside surface shaped to contact the annular stop of the standard wall fitting,
        an IR emitter located in the tee top of the inductive power transmitter, and
        an inductive transmitter coil located within the tee top and arranged such that a plane of the inductive transmitter coil is substantially parallel to the flat inductive power transfer face of the tee top, the inductive transmitter coil in electrical communication with a power source; and
    an LED lamp module including
        an LED lamp body including an upper end and a lower end, the LED lamp body containing one or more LEDs,
        a threaded male portion formed on the lower end of the LED lamp body and shaped to threadably engage the threaded interior section of the standard wall fitting, the threaded male portion including a flat surface formed on an end thereof,
        an inductive power receiver pad located adjacent the flat surface of the threaded male portion,
        an inductive power receiver coil located within the threaded male portion proximate to the inductive power receiver pad, and
        an IR receiver located in the LED lamp body of the LED lamp module;
    wherein the tee top of the inductive power transmitter is configured to be located between the annular stop of the standard wall fitting and the inductive power-receiver pad of the LED lamp module; and
    wherein the LEDs of the LED lamp module are controlled by signals detected by the IR receiver of the LED lamp module the IR emitter of the inductive power transmitter.

13. The LED lighting device of claim 12, further comprising:
    an internal depression located adjacent the flat inductive power transfer face of the inductive power transmitter and
    an IR receiver mounting cradle located adjacent the flat surface on the threaded male portion of the LED lamp module;
    wherein the IR emitter is located on the internal depression and the IR receiver is mounted on the mounting cradle; and
    wherein the IR receiver is located in visual alignment with the IR emitter when the LED lighting device is installed on the standard wall fitting.

14. The LED lighting device of claim 12, the LED lamp module further comprising a decorative trim plate removably installed on the LED lamp body.

15. The LED lighting device of claim 14, further comprising:
    a plurality of spaced-apart tabs located around an underside of the decorative trim plate;
    a plurality of notches located around an outer circumference of the LED lamp body;
    wherein the decorative trim plate is removably secured on the LED lamp body by aligning the plurality of spaced-apart tabs of the decorative trim plate with the plurality of notches of the LED lamp body and subsequently rotating the decorative trim plate with respect to the LED lamp body.

16. The LED lighting device of claim 12, further comprising a spacer located on the inductive power transmitter adjacent to the tee top, wherein the spacer is located between the tee top and the annular stop of the standard wall fitting when the LED lighting device is installed on the standard wall fitting.

17. The LED lighting device of claim 12, further comprising an electrical supply cable connected at a first end to electrical supply equipment and at a second end to the inductive power transmitter.

18. The LED lighting device of claim 1, wherein the LED lamp module is configured to be one of removed or installed on the standard wall fitting adjacent the inductive power transmitter when the standard wall fitting is located below a water level of an area at which the standard wall fitting is located.

19. The LED lighting device of claim 1, wherein the one or more LEDs of the LED lamp body are controllable to produce various color modes.

20. An LED lighting device installable on a standard wall fitting having a cylindrical body, a threaded interior section located, and an annular stop located at an end of the threaded interior section, the LED lighting device comprising:
    an inductive power transmitter including
        a housing shaped to fit through the standard wall fitting, the housing having a first end and a second end,
        a tee top located at the first end of the housing including a flat inductive power transfer face located on an end thereof and an underside surface shaped to contact the annular stop of the standard wall fitting, and
        an inductive transmitter coil located within the tee top and arranged such that a plane of the inductive transmitter coil is substantially parallel to the flat inductive power transfer face of the tee top, the inductive transmitter coil in electrical communication with a power source; and
    an LED lamp module including
        an LED lamp body including an upper end and a lower end, the LED lamp body containing one or more LEDs, a threaded male portion formed on the lower end of the LED lamp body and shaped to threadably engage the threaded interior section of the standard wall fitting, the threaded male portion including a flat surface formed on an end thereof, an inductive power receiver pad located adjacent the flat surface of the threaded male portion, and an inductive power receiver coil located within the threaded male portion proximate to the inductive power receiver pad;

wherein the tee top of the inductive power transmitter is configured to be located between the annular stop of the standard wall fitting and the inductive power-receiver pad of the LED lamp module; and wherein the LED lamp module is configured to be one of removed or installed on the standard wall fitting adjacent the inductive power transmitter when the standard wall fitting is located below a water level of an area at which the standard wall fitting is located.

* * * * *